(12) United States Patent
Nakaaki

(10) Patent No.: US 6,366,447 B1
(45) Date of Patent: Apr. 2, 2002

(54) ELECTROLYTIC CAPACITOR AND METHOD OF MANUFACTURING IT

(75) Inventor: Kentaro Nakaaki, Tokyo (JP)

(73) Assignee: Nippon Chemi-Con Corporation, Tokyo (JP)

( * ) Notice: Subject to any disclaimer, the term of this patent is extended or adjusted under 35 U.S.C. 154(b) by 0 days.

(21) Appl. No.: 09/555,357
(22) PCT Filed: Nov. 27, 1998
(86) PCT No.: PCT/JP98/05345
  § 371 Date: Jul. 31, 2000
  § 102(e) Date: Jul. 31, 2000
(87) PCT Pub. No.: WO99/28933
  PCT Pub. Date: Jun. 10, 1999

(30) Foreign Application Priority Data

Nov. 28, 1997 (JP) ............................................. 9-328499
Dec. 22, 1997 (JP) ............................................. 9-353099
Dec. 24, 1997 (JP) ............................................. 9-355186

(51) Int. Cl.[7] ................................................ H01G 9/10
(52) U.S. Cl. ...................... 361/518; 361/527; 361/502; 361/512; 361/519; 361/523
(58) Field of Search ................................ 361/518, 527, 361/502, 511, 512, 530, 536, 504, 506, 519, 520, 523, 537

(56) References Cited

U.S. PATENT DOCUMENTS 5,117,333 A  *  5/1992  Kakuma et al. ............ 361/527
5,150,283 A  *  9/1992  Yoshida et al. ............. 361/502
5,580,358 A  * 12/1996  Narusawa et al. ......... 29/25.03
6,058,006 A  *  5/2000  Yoshioka et al. ........... 361/511

FOREIGN PATENT DOCUMENTS

JP         7066084       3/1995
JP         9115786       5/1997
JP        10256102       9/1998

* cited by examiner

Primary Examiner—Dean A. Reichard
Assistant Examiner—Ha Nguyen
(74) Attorney, Agent, or Firm—Price and Gess

(57) ABSTRACT

Capacitor element (20) formed by winding both anode and cathode electrode foils connected with lead terminal (10) via a separator is placed in bottomed cylindrical shape outer case (30) made of aluminum and the like. On the outer periphery of the round rod portion (12) of the lead terminal is fitted tube (100) made of a flexible material in a movable manner. The lead terminal fitted with the tube is drawn through sealing body (110) fitted on the inner periphery of the opening of the outer case (30) outside. The sealing body includes an elastic ring (113) made of a flexible material, as fitted on the outer periphery of sealing plate (112) made of a rigid material more rigid than the tube. The lead terminal fitted with the tube is inserted in each of a pair of through-holes (111) provided on the sealing plate. Due to the pressure from the lead terminal during the insertion thereof in the through-hole, the tube deforms in an elongating fashion along the insertion direction, which works to allow the tube and the round rod portion to closely contact with each other and also allow the tube and the through-hole to closely contact with each other, so that the air tightness of the lead drawing part can be improved.

30 Claims, 16 Drawing Sheets

(A)

(B)

(C)

(A)

(B)

(C)

Cathode depolarization resistance of conventional electrolytic capacitor

ELECTROLYTIC CAPACITOR AND METHOD OF MANUFACTURING IT

TECHNICAL FIELD

The present invention relates to an electrolytic capacitor, and more specifically, to an electrolytic capacitor with an improved sealing structure.

BACKGROUND OF THE INVENTION (1) Conventional Electrolytic Capacitor

As shown in FIG. 22, the electrolytic capacitor structurally comprises capacitor element 20 formed by winding both anode and cathode electrode foils connected with lead terminal 10 as electrode drawing unit via a separator, and outer case 30 made of aluminium and a rigid resin in a bottomed cylindrical shape, where the capacitor element 20 is sealed. In this case, the lead terminal 10 is drawn outside through through-hole 41 of sealing body 40 fitted on the inner periphery of the opening of the outer case 30. Herein, rubber of a low elasticity modulus has been used as the sealing body 40, from the respect of retaining the air tightness between the lead terminal 10 passing through the sealing body 40 and the outer case 30. As shown in FIG. 23, alternatively, the lead terminal 10 comprises plain portion 11 connected to an electrode foil, round rod portion 12 for passing through the sealing body, and external connection portion 13.

Electrolytic capacitor as shown in FIGS. 22 and 23 is generally produced by the following procedures. As shown in FIG. 23, more specifically, a high-purity aluminium foil in a band shape is subjected to a chemical or electrochemical etching process so that the surface of the aluminium foil can be enlarged; and then, the aluminium foil is subjected to a chemical process in chemical solutions such as aqueous ammonium borate solution. Thus, anode electrode foil 21 with an oxide film layer formed on the surface thereof and cathode electrode foil 22 made of the high-purity aluminium foil singly processed with etching are prepared. As shown in FIG. 23, then, the plain portions 11, 11 of a pair of the lead terminals 10, 10 are individually connected to these anode electrode foil 21 and cathode electrode foil 22; then, the resulting both anode and cathode electrode foils 21, 22 are wound via a separator made of manila paper and the like, to form the capacitor element 20 (element formation process).

Subsequently, the formed capacitor element 20 is impregnated with an electrolyte solution for driving electrolytic capacitor (electrolyte solution impregnation process). Continuously, the capacitor element 20 is placed and sealed in the outer case 30 in the bottomed cylindrical shape (assembly process). At the assembly process, firstly, the lead terminal drawn out of the capacitor element 20 is inserted in the through-hole of the sealing body 40, thereby moving the lead terminal 10 relative to the sealing body 40; by subsequently drawing the whole external connection portion 13 of the lead terminal 10 from the through-hole, the round rod portion 12 of the lead terminal 10 is fixed in the through-hole of the sealing body 40. As shown in FIG. 22, then, the capacitor element 20 is placed in the outer case 30; after the sealing body 40 is fitted on the opening of the outer case 30, subsequently, the opening of the outer case 30 is subjected to a drawing process, which serves to seal the outer case 30 (assembly process).

(2) Conventional Sealing Body

As the sealing body 40 for sealing the opening of the outer case 30 in such conventional electrolytic capacitor as described above, rubber at a high elasticity modulus has been used from the respect of retaining the air tightness between the lead terminal 10 through the sealing body 40 and the outer case 30. Because rubber has a larger gas permeability constant, the electrolyte solution permeates through the rubber and is dispersed outside or exogenous gas (water, oxygen and the like) infiltrates into the inside of the case, when the rubber is used as the sealing body. Accordingly, the capacitor performance has thereby been deteriorated.

So as to prevent such occurrence, the use of a metal material or a rigid resin or the like with a small gas permeability constant as the sealing body is suggested. Because materials with small gas permeability constants generally have large elasticity moduli and are of high rigidity compared with rubber, it is difficult to retain the air tightness of the contact portion between the lead terminal passing through the sealing body and the outer case.

As shown in FIG. 22, therefore, a technique has been developed, so as to attain the reduction of the gas permeability and the enhancement of the air tightness of the contact portion between the lead terminal and the sealing body by drawing the lead terminal from the elastic body, and the technique comprises constituting a sealing body by bonding a tube-like elastic body made of rubber or a fluorine resin or the like to a sealing plate made of a rigid resin or the like or imbedding the tube-like elastic body in the sealing plate and drawing the lead terminal from the elastic body. Additionally, such technique is disclosed in for example Japanese Utility Model Laid-open Nos. 7317/1980, 115041/1980 and 132936/1980.

(3) Problems of Such Sealing Structure

As mentioned above, however, the elastic body bonded to the sealing plate or integrally imbedded in the sealing plate can have high shape stability but is relatively not readily deformable.

In conventional elastic bodies integrated with sealing plates with high rigidity, the deformation of the elastic bodies along the longitudinal direction is disturbed by the sealing plates and therefore, the elastic bodies cannot elongate along the longitudinal direction, even when the round rod portion of the lead terminal applies pressure to the elastic bodies during the insertion of the lead terminal through the elastic bodies. Consequently, the elastic bodies are compressed, leading to the volume reduction and the emergence of high stress, so that a high insertion pressure is disadvantageously applied to the lead terminal. Additionally, the elastic bodies cannot be made of materials with high elasticity moduli, involving large gas permeability constants. Hence, gas permeation can never be reduced.

So as to reduce the pressure during the insertion of the lead terminal, alternatively, the inner diameter of an elastic body can be almost equal to the outer diameter of the round rod portion of the lead terminal. In that case, however, slight error in the dimension of the elastic body occurs in a dependent manner on the processing precision and dimensional precision of the elastic body, which reduces the air tightness between the elastic body and the lead terminal, involving the enlargement of the variation of the life profile, disadvantageously.

On contrast, a modification of the production method of sealing bodies enables the procurement of a higher processing precision and a higher dimensional precision than conventional ones, but such modification induces the reduction of the productivity and also raises the production cost, undesirably.

Furthermore, the conventional methods comprising bonding an elastic body to the inner face of the through-hole of a sealing plate or imbedding an elastic body in the inner face thereof during the molding of the sealing plate requires complicated procedures, disadvantageously, leading to the reduction of the productivity.

(4) Problems due to Electrolyte Solution

Various types of electrolyte solutions for the impregnation of capacitor element 3 and for driving electrolytic capacitor have been known, and the performance of an electrolyte capacitor depends on the electrolyte solutions used therein. Among them, an electrolyte solution using γ- butyrolactone as the principal solvent and so-called quaternary ammonium salt as the dissolving substance, namely a salt comprising tetraalkylammonium ion as the cation component and an acid-conjugated base as the anion component has been known.

The electrolyte solution using the quaternary ammonium salt characteristically has low electric resistance and has great thermal stability, but is nevertheless likely to leak due to the mechanism described below.

Therefore, the quaternary ammonium salt used as the electrolyte solution in the electrolytic capacitor induces the deterioration of the electrical performance of the electrolytic capacitor, such as the reduction of the capacity of the electrolytic capacitor, due to the leakage of the electrolyte solution, so that the life of the electrolytic capacitor is shortened, disadvantageously.

Herein, the leakage of the electrolytic solution using quaternary ammonium salt is now described below. More specifically, leakage current occurs between the anode electrode foil 21 and the cathode electrode foil 22 under the application of direct voltage, because of the damage of the oxide film formed on the surface of the anode electrode foil 21, in such general-type electrolytic capacitor. Due to the occurrence of such leakage current, the reduction of dissolved oxygen or hydrogen ion occurs on the cathode side, with the resultant increase of the concentration of hydroxide ion in the interface between the electrode on the side of the cathode and the electrolyte solution. The phenomenon occurs both on the cathode electrode foil 22 and the lead terminal 10 for drawing the cathode; the increase of hydroxide ion, namely the increase of basicity, is observed in the proximity of the lead terminal, in particular. As the basicity increases in such manner, the sealing body 40 in contact to the lead terminal 10 is progressively damaged, involving the deterioration of the close contact between the lead terminal 10 and the sealing body 40, so that the hydroxide solution highly basic supposedly leaks outside.

As shown in FIG. 24, in other words, the leakage current of the electrolytic capacitor is expressed as the sum of the current $I_2$ flowing in the cathode electrode foil 22 and the current $I_1$ flowing in the lead terminal 10 for drawing the cathode, at the cathode side. Because the spontaneous potential $E_1$ of the lead terminal 10 for drawing the cathode is generally at a nobler electric potential than the spontaneous potential $E_2$ of the cathode electrode foil 22, the reduction of dissolved oxygen or hydrogen ion occurs due to the current initially flowing in the lead terminal 10 when the cathode side is cathode depolarized at a state loaded with direct current. Then, a current never consumed up for the reduction of dissolved oxygen or hydrogen ion on the lead terminal 10 flows in the cathode electrode foil 22, which induces reduction on the cathode electrode foil 22.

In this case, the active surface area of the cathode electrode foil 22 is so larger than the active surface area of the lead terminal 10 that the depolarization resistance of the cathode electrode foil 22 is smaller than the depolarization resistance of the lead terminal 10. Thus, at the voltage Eτ serving as the rated value $I_\tau$ of the leakage current of the electrolytic capacitor, the current $I_1$ flows even in the lead terminal 10, although the current $I_2$ flowing in the cathode electrode foil 22 is larger.

At a state loaded with direct current, therefore, the lead terminal 10 is continuously retained at a state in the flow of electric current, so that the reduction of dissolved oxygen or hydrogen ion consistently occurs on the surface of the lead terminal 10. Then, the resulting basic hydroxide ion incurs the decrease of the sealing precision.

When the electrolytic capacitor is left under no load, a local battery is constituted between the lead terminal for drawing the cathode and the cathode foil, because the spontaneous immersion potential $E_1$ is higher than the spontaneous immersion potential $E_2$ of the cathode foil, so that the reduction of dissolved oxygen or hydrogen ion occurs at the side of the lead terminal. At the state under no load, consequently, the resulting basic hydroxide ion incurs the decrease of the sealing precision.

As the electrolyte solution for driving electrolytic capacitor, with which the capacitor element 1 is impregnated, use is also made of an electrolyte solution dissolving a salt comprising an acid-conjugated base as the anion component and quaternary-prepared cyclic amidinium as the cation component (PCT/JP94/02028) in the principal solvents of γ-butyrolactone and ethylene glycol.

Because the hydroxide ion generated via the reduction of dissolved oxygen or hydrogen ion due to the occurrence of leak current as described above reacts with the quaternary-prepared cyclic amidinium and is thereby eliminated in case of the electrolyte solution dissolving the quaternary-prepared cyclic amidinium, it has been considered that the leakage of the electrolyte solution can be prevented.

As the outcome of the investigations made by the present inventors, however, it is revealed that the reaction of hydroxide ion with quaternary-prepared cyclic amidinium cannot progress completely when the interface between the electrode on the side of the cathode and the electrolyte solution is at a pH value of 12 or less, so that the hydroxide ion still remains. Under specific conditions, therefore, the leakage of the electrolyte solution dissolving quaternary-prepared cyclic amidinium salt cannot be suppressed completely as in the case of the electrolyte solution using quaternary ammonium salt, so that the resulting highly basic hydroxide solution leaks outside.

As has been described above, liquid leakage from electrolytic capacitors using quaternary ammonium salt and quaternary-prepared cyclic amidinium salt cannot be suppressed completely so that the resulting highly basic hydroxide solution leaks outside. When elastic rubber is used in the sealing body, accordingly, the sealing body is severely deteriorated, leading to poor air tightness.

(5) Objects of the Invention

The present invention has been proposed so as to overcome the problems of the conventional techniques. One object thereof is to provide a great electrolytic capacitor with a stably high life profile and possible contribution to the enhancement of productivity and the reduction of production cost, by improving the sealing structure. Another object is to provide a great method for efficiently producing such great electrolytic capacitor at low cost.

In addition, another object of the invention is to provide a great electrolytic capacitor using quaternary ammonium salt and quaternary- prepared amidinium salt, with a stably high life profile and possible contribution to the enhancement of productivity and the reduction of production cost, by improving the sealing structure to prevent the deterioration of the sealing body due to the electrolyte solution. A still additional purpose is to provide a great method for efficiently producing such great electrolytic capacitor at low cost.

DISCLOSURE OF THE INVENTION

So as to overcome the problems, in accordance with the present invention, an electrolytic capacitor with an improved sealing structure is provided, the capacitor comprising a capacitor element formed by winding both anode and cathode electrode foils connected with electrode drawing units via a separator, an outer case in a bottomed cylindrical shape for placing the capacitor element therein, and a sealing unit fitted on the opening of the outer case, wherein the electrode drawing unit comprises a plain portion for inner connection, a round rod portion for passing through the sealing unit, and an external connection portion and wherein the electrode drawing unit is drawn through a through-hole provided on the sealing unit outside the outer case; and an improved method for producing such electrolytic capacitor is also provided.

In accordance with the present invention, an electrolytic capacitor is provided, wherein a tube for retaining air tightness is placed between the through-hole of the sealing unit and the electrode drawing unit in a movable manner relative to the through-hole. When the round rod portion of the electrode drawing unit is inserted in the through-hole of the sealing unit during the process of producing the electrolytic capacitor, the tube placed between the round rod portion and the through-hole elongates along the direction of the insertion thereof due to the pressure from the electrode drawing unit because the tube is not bonded to the through-hole of the sealing unit with any adhesive or the like, so that the stress is dispersed to enhance the close contact between the tube and the round rod portion and the close contact between the tube and the through-hole. Because sufficient elasticity can be attained due to such elongation of the tube along the insertion direction, the elasticity can be utilized to readily insert even a tube with low gas permeability and a high elasticity modulus (high rigidity). Depending on the material of the tube, therefore, the gas permeability of the through-part of the electrode drawing unit can be reduced sufficiently and the air tightness of the part can be improved satisfactorily. Additionally, such tube can be produced readily and efficiently by series production.

In a first aspect of the inventive electrolytic capacitor, a tube made of a flexible material is fitted in a movable manner on the outer periphery of the round rod portion of the electrode drawing unit; and additionally, a portion including at least the through-hole of the sealing unit is made of a rigid material more rigid than the tube; and the round rod portion fitted with the tube is inserted in the through-hole of the sealing unit body. Because the sealing unit is made of a rigid material more rigid than the tube, in the electrolytic capacitor, the electrolytic capacitor is at low gas permeability. By using the tube made of a flexible material, furthermore, the tube can elongate well along the insertion direction due to the pressure loaded during the insertion of the electrode drawing unit into the through- hole, so that the air tightness of the through-part of the electrode drawing unit can be enhanced sufficiently.

In a second aspect of the inventive electrolytic capacitor, a tube made of a flexible material is fitted in a movable manner in the through-hole of the sealing unit made of a rigid material. The round rod portion of the electrode drawing unit is inserted in the tube. Even in the electrolytic capacitor, the tube can elongate well along the insertion direction due to the pressure during the insertion of the electrode drawing unit into the through-hole, as in the case of the tube fitted on the side of the electrode drawing unit, so that the air tightness of the through-part of the electrode drawing unit can be improved sufficiently.

A third aspect of the inventive electrolytic capacitor is characteristic in that a tube made of an alkali-resistant resin is fitted in a movable manner on the outer periphery of the round rod portion of at least the electrode drawing unit on the side of the cathode in case that an electrolyte solution containing quaternary ammonium salt or quaternary-prepared amidinium salt is used and that the round rod portion fitted with the tube is inserted in the through-hole provided on the sealing unit. Because the tube made of an alkali-resistant resin is fitted on the round rod portion of at least the electrode drawing unit on the side of the cathode, in the electrolytic capacitor, the deterioration of the through-part of the electrode drawing unit at the side of the cathode, where basicity is likely to increase, can be prevented so effectively that the air tightness between the round rod portion and the sealing unit can be enhanced. Preferably, the sealing unit is made of an alkali-resistant resin, thereby, even in case that highly basic hydroxide solutions are generated, the deterioration of the sealing unit per se can be prevented, with the resulting higher enhancement of the air tightness. Because the tube is fitted in a movable fashion on the round rod portion of the electrode drawing unit, as in the case of the aforementioned electrolytic capacitor, the tube can elongate well along the insertion direction, owing to the pressure loaded during the insertion of the electrode drawing unit in the through-hole. Thus, the air tightness of the through-part of the electrode drawing unit can be improved satisfactorily.

In the plural aspects of the electrolytic capacitor, preferably, the inner diameter of the tube is smaller than the outer diameter of the round rod portion of the electrode drawing unit. Similarly, the outer diameter of the tube is preferably larger than the diameter of the through-hole of the sealing unit, when the tube has been fitted on the round rod portion of the electrode drawing unit. Owing to the dimensional relation thereof, the close contact among the members can be enhanced, so the air tightness of the through-part of the electrode drawing unit can be enhanced more greatly.

Additionally, preferably, the diameter of at least the opening end on the side of the insertion inlet of the electrode drawing unit is larger than the diameter of the central part thereof. Thereby, the round rod portion of the electrode drawing unit can readily be inserted; and at least at the central part of the through-hole, the outer periphery face of the tube is secured to closely contact with the inner periphery face of the sealing unit.

Additionally, the sealing unit preferably comprises a sealing plate and an outer member made of a flexible material fitted on the outer periphery of the sealing plate. Even when the sealing plate is more or less inconsistent dimensionally, the elasticity of the outer periphery member made of a flexible material can absorb the dimensional error, so that the outer periphery face of the sealing unit is secured to closely contact with the inner periphery face of the opening of the outer case. Furthermore, preferably, the outer periphery member of the sealing unit is formed in a tube-like shape, while the inner diameter of the outer periphery member is smaller than the outer diameter of the sealing plate. The air tightness of the outer periphery part of the sealing structure can thereby be more enhanced, due to the elevation of the close contact between the sealing plate and the outer periphery member.

BEST MODE FOR CARRYING OUT THE INVENTION

The best mode for carrying out the invention is explained below with reference to drawings.

1. First Embodiment 1-1. Configuration of Electrolytic Capacitor

Figure 1:
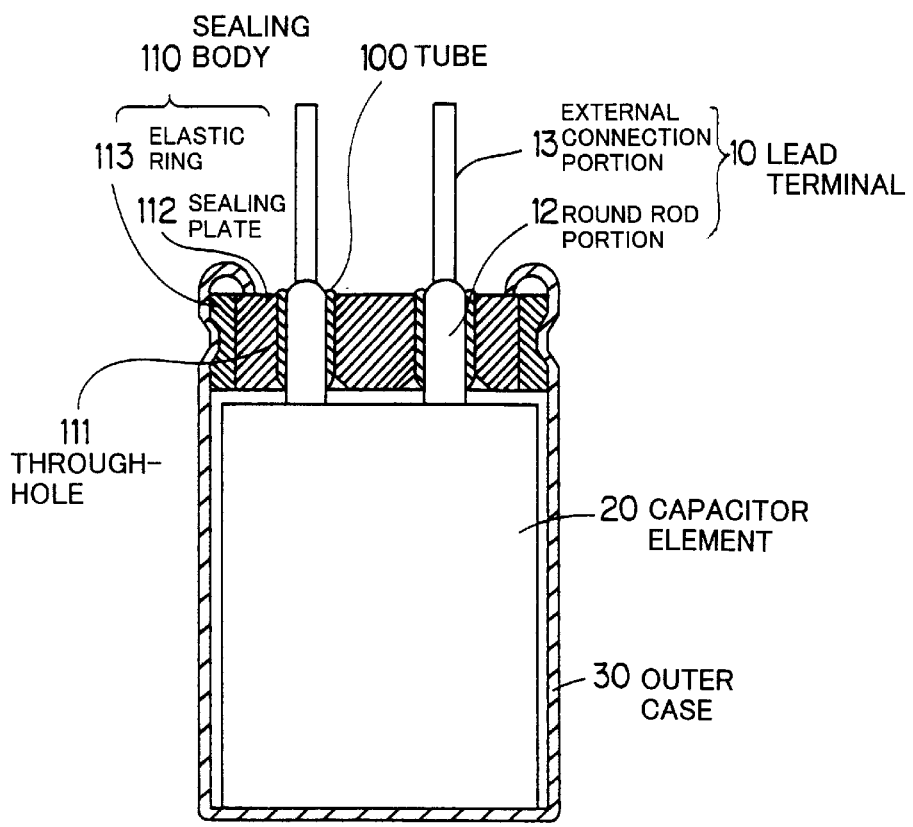
FIG. 1 is a cross sectional view of one embodiment of the inventive electrolytic capacitor.

FIG. 1 is a cross sectional view of one typical embodiment of the inventive electrolytic capacitor. As shown in FIG. 1, capacitor element 20 formed by winding both anode and cathode electrode foils connected with lead terminal 10 (electrode drawing unit) via a separator is placed in outer case 30 made of aluminium or the like in a bottomed cylindrical shape. In this case, tube 100 is fitted in a movable fashion on the outer periphery of round rod portion 12 of the lead terminal 10; the lead terminal 10 fitted with the tube 100 is drawn outside through through-hole 111 of sealing body 110 fitted in the inner periphery of the outer case 30. More specifically, the opening of the outer case 30 is sealed with the tube 100 and the sealing body 110, while a drawing process permits the top of the opening to be in contact to sealing plate 112 of the sealing body 110. The sealing structure of FIG. 1, namely a sealing structure prepared by inserting the lead terminal 10 fitted with the tube 100 in the through-hole 111 of the sealing body 110, is described in detail.

Figure 2:
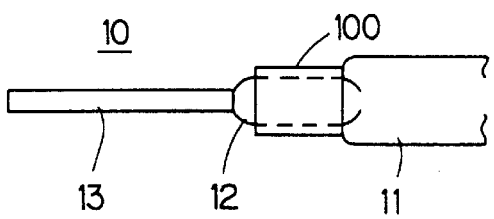
FIG. 2 is a view of the lead terminal fitted with tube in the electrolytic capacitor of FIG. 1, wherein (A) is a plain view; (B) is a front view; and (C) is a side view.
Figure 2:
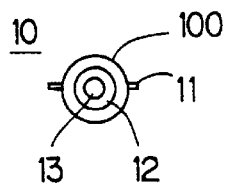
Figure 2:
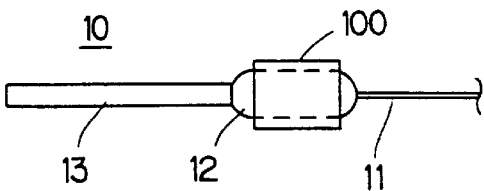

FIG. 2 is a view of the lead terminal 10 fitted with tube 100, wherein (A) is a plain view; (B) is a front view; and (C) is a side view. As shown in FIG. 2, the lead terminal 10 comprises plain portion 11 for inner connection, round rod portion 12 for passing through the sealing body, and external connection portion 13, wherein tube 100 made of a flexible material is fitted in a movable manner on the round rod portion 12. In this case, the inner diameter of the tube 100 is smaller than the outer diameter of the round rod portion 12.

As the flexible material composing the tube 100, herein, use is made of a material selected from the group of flexible materials including rubber, fluorine resin, shrinkable tube, polyethylene, polyester, polyimide, polyamide, nylon, polyamide-imide, silicone resin, silicone rubber, poly-4-methylpentene-1 (crystallizable polyolefin), and ethylene vinyl alcohol. More specifically, the tube 100 can satisfactorily comprise the type of a flexible material appropriately selected. By using the material described above, the quality can be improved, such as the improvement of the air tightness between the tube and the outer periphery part of the sealing unit, of which the flexibility can sufficiently be attained; additionally, the use of the material is excellent in terms of processability and cost.

Figure 3:
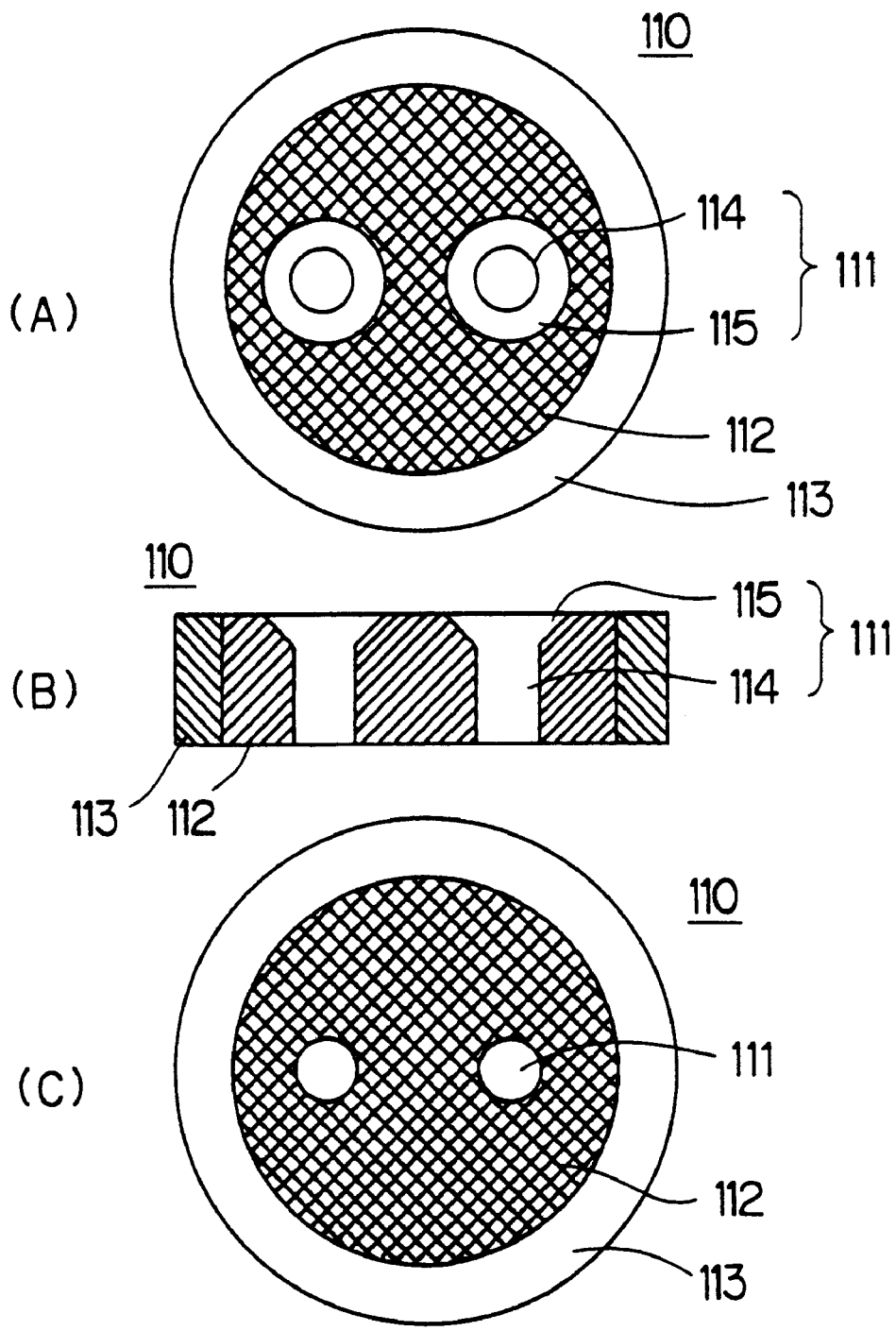
FIG. 3 is a view of the sealing body in the electrolytic capacitor of FIG. 1, wherein (A) is a plain view; (B) is a cross sectional view; and (C) is a bottom view.

FIG. 3 is a view of the sealing body 110, wherein (A) is a plain view; (B) is a longitudinal cross sectional view; and (C) is a bottom view. As shown in FIG. 3, the sealing body 110 comprises elastic ring (outer periphery member) 113 in a tube shape made of a flexible material being fitted on the outer periphery of sealing plate 112 made of a material more rigid than the tube 100. In this case, the inner diameter of the elastic ring 113 is smaller than the outer diameter of the sealing plate 112. Then, a pair of through-holes 111, 111 for drawing lead are provided on the sealing plate 112 of the sealing body 110.

As the rigid material composing the sealing plate 112, furthermore, use is made of a material selected from a diverse variety of rigid material groups, including a resin material group including fluorine resin, polyphenylene sulfide, nylon, phenol, epoxy, polysulfone, polyimide, polyamide-imide, polyoxybenzylene polyethylene, polypropylene, and polycarbonate; and a metal material group including aluminium, tantalum, magnesium, copper, nickel, titanium or alloys thereof; rigid rubber, ceramic and glass. In other words, the type of a material to be used in the sealing plate 112 can appropriately be selected. By using the material described above, particularly, the gas permeability of the sealing plate can be lowered sufficiently. Thus, the quality can be improved. Additionally, the use of the material is excellent in terms of processability and cost. In case that a metal material is selected from the rigid material group, an insulation layer of a resin film made of epoxy resin, nylon resin and the like or oxide film is formed on the surface of the metal material, for the purpose of procuring the insulation between the lead terminal 10 and the capacitor element 20. Such insulation layer can readily be formed by existing methods. Additionally, a material selected from the flexible material group listed for the tube 100 is used as the flexible material composing the elastic ring 113.

Figure 4:
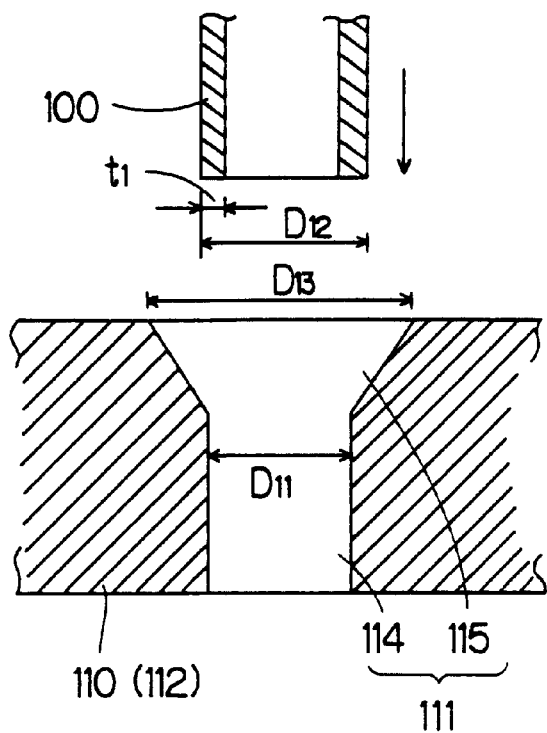
FIG. 4 is an explanatory view of the dimensional relation between the through-hole of the sealing body and the tube.

FIG. 4 is an explanatory view of the dimensional relation between the through-hole 111 of the sealing body 110 and the tube 100. As shown in FIG. 4, the through-hole 111 of the sealing body 110 comprises linear portion 114 with a constant diameter dimension and insertion guide portion 115 enlarging with a slope toward the opening end on the side of the insertion of the lead terminal 10. Provided that the diameter of the linear portion 114 of the through-hole 111 is designated $D_{11}$; the outer diameter of the tube 100 when it has been fitted on the round rod portion 12 is designated $D_{12}$; and the maximum diameter of the insertion guide part 115 is designated $D_{13}$, their relation is represented by the following formula.

$$D_{11} < D_{12} < D_{13}$$

Preferably, the diameter $D_{11}$ of the linear portion 114 of the through-hole 111 is at a value obtained by subtracting 5% to 100% of the thickness size $t_1$ of the tube 100 from the outer diameter $D_{12}$ of the tube 100 when it has been fitted on the rod potion 12. The relation is expressed by the following formula.

$$D_{11} = D_{12} - t_1(k/100)$$

wherein 5<=k<=100

1-2. Production Process of Electrolytic Capacitor

The electrolytic capacitor of FIG. 1 having the configuration described above can specifically be produced by the following procedures. First, the plain portions 11, 11 of a pair of the lead terminals 10, 10 are connected individually to both the anode and cathode electrode foils; by winding both the anode and cathode electrode foils via a separator, capacitor element 20 is formed.

Figure 5:
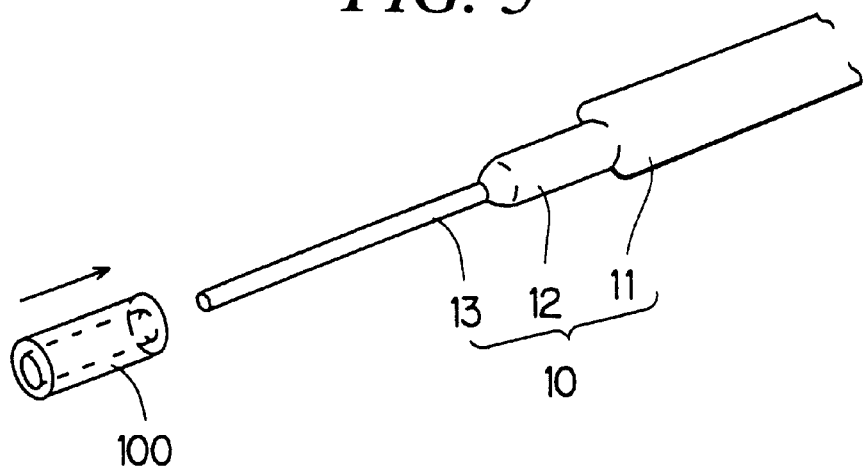
FIG. 5 is a perspective view of the tube fitting step of the production process of the electrolytic capacitor of FIG. 1.

As shown in FIG. 5, subsequently, the top part of the external connection portion 13 of each of a pair of the lead terminals 10, 10 protruding from the capacitor element 20 is inserted in the tube 100, to allow the lead terminal 10 to move relative to the tube 100; by drawing the whole external connection portion 13 from the inside of the lead terminal 10, the tube 100 is fitted on the outer periphery of the round rod portion 12 of the lead terminal 10. More specifically, by using an appropriate production machine and a long tube material in reel unit, a tube material is continuously fed at an appropriate velocity. By sequentially cutting the tube material at a size for use as shown in FIG. 2, the predetermined tube 100 is prepared, into which the lead terminal 10 is then inserted, to continuously arrange the tube 100 (tube fitting step). By similarly using a long tube material for the sealing body 110, the tube material is sequentially cut at a size for use, to form predetermined elastic ring 113; into the elastic ring 113 is inserted the sealing plate 112, to continuously arrange the elastic ring 113 (second tube fitting step) and thereby form the sealing body 110 continuously.

Figure 6:
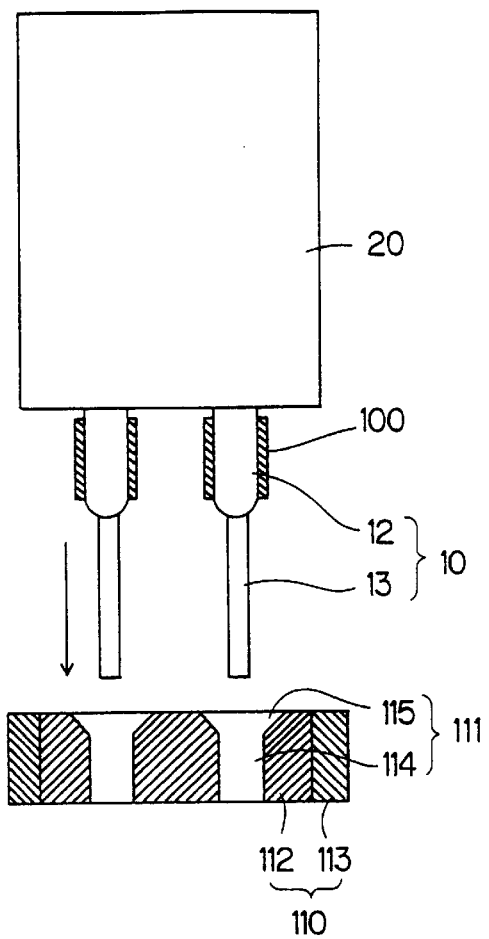
FIG. 6 is a cross sectional view of the subsequent electrode drawing step.

As shown in FIG. 6, continuously, the lead terminal 10 fitted with the tube 100 is inserted in the through-hole 111 of the sealing body 110, to permit the lead terminal 10 to move relative to the through-hole 111; by drawing the whole external connection portion 13 of the lead terminal 10 from the through-hole 111, the round rod portion 12 fitted with the tube 100 is fixed in the through-hole 111.

Subsequently, the capacitor element 20 is placed in the outer case 30; by fitting the sealing body 110 in the opening of the outer case 30, the outer case 30 is sealed. As shown in FIG. 1, in this case, the opening of the outer case 30 is subjected to a drawing process, to put the top of the opening in contact to the sealing plate 112.

1-3. Actions and Effects

The electrolytic capacitor of the present embodiment and the process for producing the same have the following actions and effects.

Because the sealing body 110 mainly comprises the sealing plate 112 made of a rigid material such as rigid resin, metal, rigid rubber, ceramic and glass, the gas permeability can be lowered. Because the tube 100 made of a flexible material such as rubber, resin and shrinkable tube is fitted on the round rod portion 12 of the lead terminal 10 and the lead terminal 10 fitted with the tube 100 is drawn out of the through-hole 111 of the sealing body 110, additionally, the air tightness of the lead drawing part in the sealing body 110 can be further improved.

Because the tube 100 is fitted in a movable manner on the side of the lead terminal 10, with no bonding to or imbedding in the sealing plate 112, the tube can readily deform in an elongating fashion along the direction of the insertion of the lead terminal 10 in the tube 100, owing to the pressure from the lead terminal 10. Thus, such elongation of the tube 100 enables the dispersion of the stress, to establish sufficient close contact between the tube 100 and the round rod portion 12 of the lead terminal 10. Because the inner periphery face of the tube 100 and the outer periphery face of the round rod portion 12 can be secured to closely contact with each other over the entire surface in their contact region, due to the dimensional relation between the tube 100 and the round rod portion 12, the air tightness of the region can be enhanced.

Because the tube 100 is never bonded to or imbedded in the sealing plate 112, the tube 100 can readily deform in an elongating fashion along the direction of the insertion of the lead terminal 10 fitted with the tube 100 when it is going to be inserted in the through-hole 111 of the sealing body 110. Due to such elongation of the tube 100, the stress is dispersed to establish sufficient close contact between the tube 100 and the through-hole 111. Because the tube 100 can readily deform in such manner, the tube 100 of an outer diameter larger than the diameter of the through-hole 111 can be used, as described above. Because the outer periphery face of the tube 100 and the inner periphery face of the linear portion 114 of the through-hole 111 can be secured to closely contact with each other over the entire surface in their contact region, due to such dimensional relation, the air tightness of the region can be enhanced.

Because the tube 100 fitted on the round rod portion 12 of the lead terminal 10 elongates along the direction of the insertion of the round rod portion 12 when it is going to be inserted in the through-hole 111 of the sealing body 110, as described above, sufficient elasticity can be attained, so that even a tube with low gas permeability and a high elasticity modulus (high rigidity) can readily be inserted, by utilizing the elasticity. Hence, the gas permeability can sufficiently be lowered, depending on the material of the tube 100, while high air tightness can be attained.

Because the tube 100 in the embodiment is movable along the insertion direction, additionally, any abnormally high pressure inside the outer case due to the inner disorder may push the tube 100 outside, so that the tube 100 can function as a safety valve. Accordingly, the safety profile of the electrolytic capacitor can be improved.

Because the sealing body 10 comprises the sealing plate 112 made of a rigid material and the elastic ring 113 made of a flexible material in the embodiment, furthermore, the outer periphery face of the sealing body 110 and the inner periphery face of the opening of the outer case 30 can be secured to closely contact with each other, so that the air tightness of the region can be enhanced. Even at a slight dimensional variation of the sealing body 110, consequently, the elasticity of the elastic ring 113 of the sealing body 110 can absorb the dimensional error to achieve sufficient close contact. Thus, the air tightness of the region can sufficiently be attained.

Because the top of the opening of the outer case 30 is put in contact to the sealing plate 112 in the embodiment, additionally, the sealing body 110 is strongly held in position, so that it can be suppressed for the sealing body 110 to spring out of the outer case 30 due to thermal stress. When the top of the opening of the outer case 30 is put in contact not to the sealing plate 12 but to the elastic ring 113, unlike the case of the embodiment, the sealing plate 112 is potentially dissociated from the elastic ring due to thermal stress because the sealing plate 112 and the elastic ring 113 are not bonded to each other. However, such dissociation of the sealing plate 112 can absolutely be prevented, when the top of the opening of the outer case 30 is put in contact to the sealing plate 112, as in the case of the embodiment.

Because the process of inserting the lead terminal 10 in the tube 100 made of a flexible material and the process of inserting the resulting lead terminal fitted with the tube in the through-hole 111 of the sealing plate 112 of the sealing body 110 made of a rigid material are extremely readily carried out at high efficiency at the aforementioned production step, the electrolytic capacitor can readily be produced at high efficiency. Because the insertion guide part 115 enlarging with a slope toward the opening end on the side of the insertion inlet of the lead terminal 10 is provided in the through-hole 111, in this case, the round rod portion 12 of the lead terminal 10 fitted with the tube 100 can readily be inserted.

Particularly because the lead terminal 10 can be inserted in the tube 100 formed by using a suitable production machine and a long tube material in reel unit, continuously supplying the tube material at an appropriate velocity and sequentially cutting the tube material at a size for use to prepare the predetermined tube 100, the process of fitting the tube 100 can continuously be carried out by using a simple existing production machine at high efficiency. Because the tube is satisfactorily supplied in reel unit, in this case, the production efficiency can be improved from the respect. Additionally because such tube 100 can be produced readily at high efficiency by series production, the tube can make contribution to the improvement of the production efficiency from such respect. Because the elastic ring 113 can readily be fitted continuously on the outer periphery of the sealing plate 112 by using a long tube material, additionally, the process of fitting the elastic ring 113 can readily be carried out at high efficiency, like the case of the tube 100. Thus, the production efficiency can be improved.

1-4. Modification Example

As a modification example of the sealing body 110 in the electrolytic capacitor of FIG. 1, furthermore, insertion guide part 115 enlarging toward the opening end of the sealing body 110 can individually be provided, for example, on both the faces of the sealing body 110. Because the air tightness of the tube 100 and the through-hole 111 can sufficiently be attained and the lead terminal 10 fitted with the tube 100 can be inserted from any face of the sealing body 110, in this case, the processability can be improved.

Figure 7:
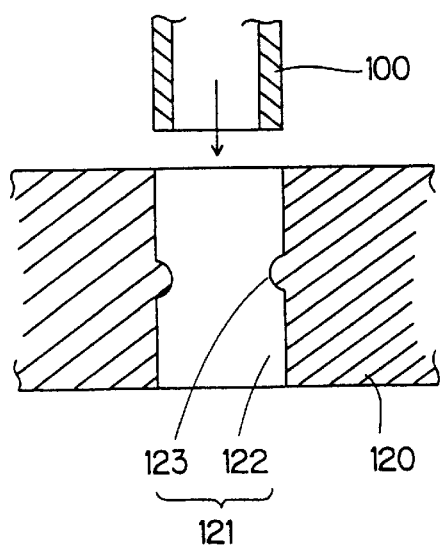
FIG. 7 is a cross sectional view of one example of another shape of the through-hole formed in the sealing body of the invention.

As shown in FIG. 7, it is proposed as another example of the sealing body that the through-hole 121 of the sealing body 120 is in a shape comprising linear part 122 of a given diameter dimension approximately equal to the outer diameter dimension of the tube 100 when it has been fitted on the round rod portion 12, and small diameter zone 123 in the center thereof Because the air tightness of the tube 100 and the through-hole 121 can be attained sufficiently and the lead terminal 10 fitted with the tube 100 can be inserted from any face of the sealing body 110, in this case, the processability can also be improved.

Still additionally, the sealing body 110 in the electrolytic capacitor of FIG. 1 comprises the sealing plate 112 made of a rigid material and the elastic ring 113 made of a flexible material, but the sealing unit possibly comprises only the sealing plate made of a rigid material. By a configuration prepared by providing for example a step part protruding toward the outer periphery on the upper part of the sealing plate and covering the top face of the opening part of the outer case and the inner periphery face following the top face with the sealing plate in the form of character L, in this case, the air tightness of the sealing plate and the outer case can be attained.

1-5. Example

So as to specifically assess the life profile of the inventive electrolytic capacitor as described above, then, a conventional product simply using sealing rubber and the inventive product using the tube 100 and the sealing body 110 as shown in FIG. 1 were used to prepare individual electrolytic capacitors of the same rate 16 V-47 $\mu$F ($\phi$6.3×5 L) in the same configuration, except for the sealing structure.

As the materials of the tube 100 and the elastic ring 113 of the sealing body 110 in the inventive product, in this case, a fluorine resin was used; as the material of the sealing plate 112 of the sealing body 110, aluminum was used for the preparation of an oxide film on the surface thereof. The conventional product (Comparative Example 1) and the inventive product (Example 1), thus prepared, were subjected to standing tests at 105° C. and 130° C. The change in the weight decrement, percentage volume change and tan$\sigma$ over time was examined. The results are shown hereinbelow in Tables 1 and 2.

TABLE 1

Standing test at 105° C.

| | | Initial value | 1000 hours later | 2000 hours later |
| --- | --- | --- | --- | --- |
| Weight decrement | Comparative Example 1 | 0 | −5 mg | −12 mg |
| | Example 1 | 0 | −1 mg | −2 mg |
| Percentage volume change | Comparative Example 1 | 46.7 $\mu$F | −7 % | −15 % |
| | Example 1 | 46.8 $\mu$F | −5 % | −6 % |
| tan$\sigma$ | Comparative Example 1 | 0.062 | 0.071 | 0.3 |
| | Example 1 | 0.062 | 0.062 | 0.07 |

TABLE 2

Standing test at 130° C.

|  |  | Initial value | 500 hours later | 1000 hours later |
|---|---|---|---|---|
| Weight decrement | Comparative Example 1 | 0 | −11 mg | −18 mg |
|  | Example 1 | 0 | −1 mg | −2 mg |
| Percentage volume change | Comparative Example 1 | 46.5 μF | −13 % | −85 % |
|  | Example 1 | 46.7 μF | −5 % | −6 % |
| tanσ | Comparative Example 1 | 0.062 | 0.28 | — |
|  | Example 1 | 0.062 | 0.065 | 0.072 |

As apparently shown in Table 1, the weight decrement was −5 mg so early as 1000 hours later in Comparative Example 1 left to stand at 105° C.; the weight decrement was −12 mg, 2000 hours later, while the percentage volume change was greatly decreased by −15% and the tanσ value was markedly increased to about 5-fold the initial value. Alternatively, in Example 1, the weight decrement was −2 mg, 2000 hours later, while the percentage volume change was at about −6% and the tanσ value was slightly increased, compared with the initial value.

At the standing test at 105° C., as described above, the characteristic properties of Comparative Example 1 were deteriorated as early as 1000 hours later and were severely deteriorated 2000 hours later. In Example 1, on contrast, the characteristic properties thereof were retained at excellent values close to the initial values.

As apparently shown in Table 2, additionally, the weight decrement was −11 mg so early as 500 hours later in Comparative Example 1 left to stand at 130° C., while the percentage volume change was greatly decreased by −13% and the tanσ value was markedly increased to about 4.5-fold the initial value. 1000 hours later, furthermore, the weight decrement was as large as −18 mg and the percentage volume change was significantly decreased by −85%. Thus, Comparative Example 1 is absolutely never usable. In Example 1, on contrast, the weight decrement was as small as −2 mg and the percentage volume change was at about −6%, while the tanσ value was increased slightly more than the initial value, even 1000 hours later.

At the standing test at 130° C., as has been described above, significant deterioration of the characteristic properties of Comparative Example 1 was observed as early as 500 hours later; and Comparative Example 1 could never be used 1000 hours later, while Example 1 retained excellent values close to the initial values.

It is thus indicated that Example 1 has an excellent life profile, particularly an excellent heat-resistant life profile, compared with Comparative Example 1. This demonstrates that an electrolytic capacitor with a stably high life profile owing to the inventive sealing structure was prepared by inserting the lead terminal fitted with the tube made of a flexible material in the through-hole of the sealing body made of a rigid material.

2. Second Embodiment 2-1. Configuration of Electrolyte Capacitor

Figure 8:
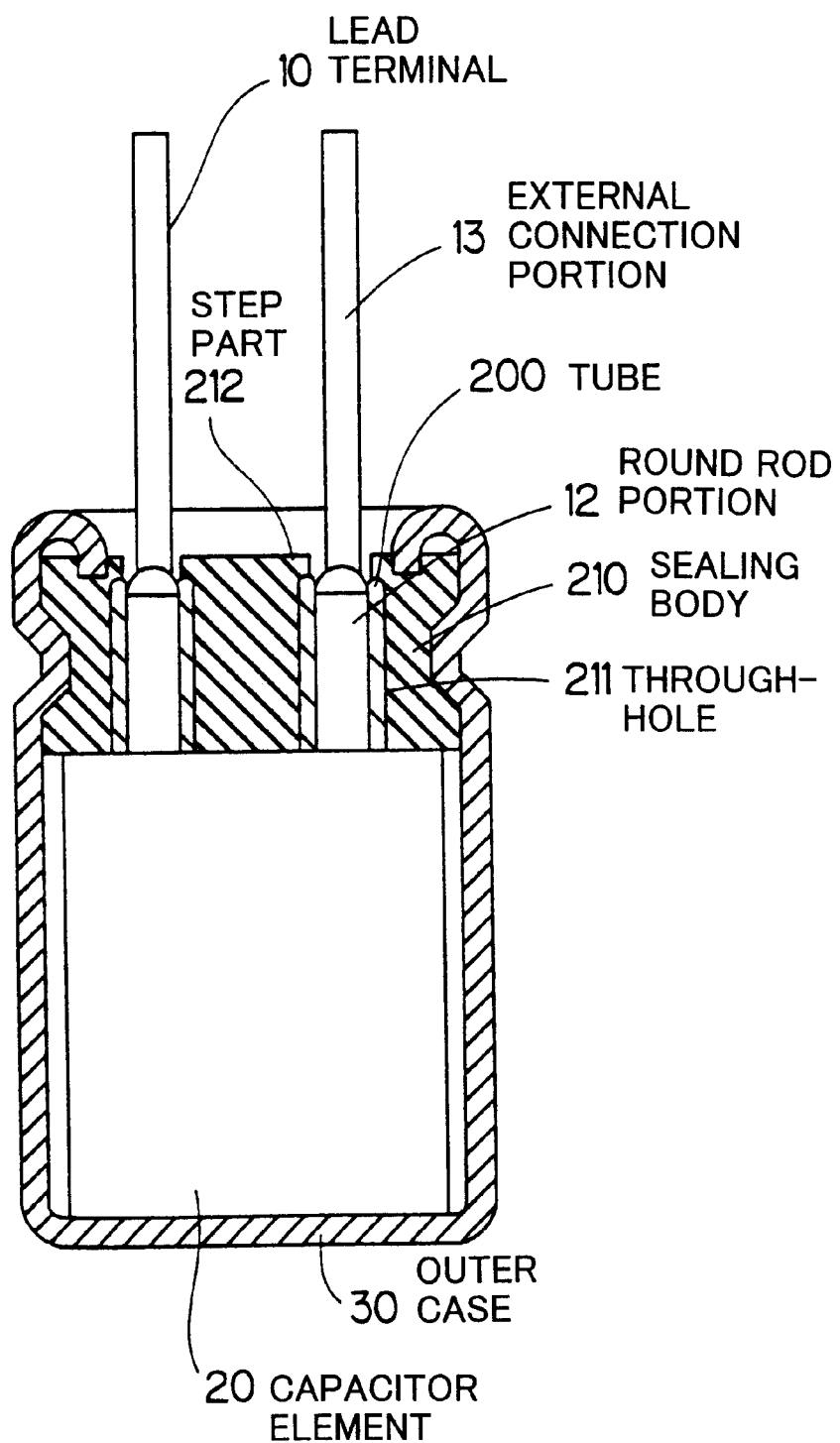
FIG. 8 is a cross sectional view of the configuration of another embodiment of the inventive electrolytic capacitor.

FIG. 8 is a cross sectional view of the structure of a second embodiment of the inventive electrolytic capacitor. As shown in FIG. 8, capacitor element 20 formed by winding both anode and cathode electrode foils connected with lead terminal 10 (electrode drawing unit) via a separator is placed in outer case 30 made of aluminium or the like in a bottomed cylindrical shape.

Furthermore, the sealing body 210 sealing the opening of the outer case 30 comprises a single member as shown in FIG. 8, wherein through-holes 211, 211 are formed on predetermined positions. On the inward face of the through-holes on the lead drawing side (upper part in the figure) is formed a step part 212 protruding inward. The step part 212 functions as a fastening part suppressing the shift of the tube 200, as described below. The sealing structure of FIG. 8, namely the sealing structure of the sealing body 210, which is formed by inserting the lead terminal 10 in the through-hole 211 fitted with the tube 200, is described in detail hereinbelow.

Firstly, the rigid material composing the sealing body 210 is selected from the group of diverse rigid materials listed for the sealing body 110 of the first embodiment (FIG. 1), namely the rigid material group including the resin material group including fluorine resin, polyphenylene sulfide, nylon, phenol, epoxy, polysulfone, polyimide, polyamide-imide, polyoxybenzylene polyethylene, polypropylene, and polycarbonate; the metal material group including aluminium, tantalum, magnesium, copper, nickel, titanium or alloys thereof; rigid rubber, ceramic and glass. In case that a metal material is selected from the rigid material group, an insulation layer of a resin film made of epoxy resin, nylon resin and the like or oxide film is formed on the surface of the metal material, for the purpose of procuring the insulation between the lead terminal 10 and the capacitor element 20.

Figure 9:
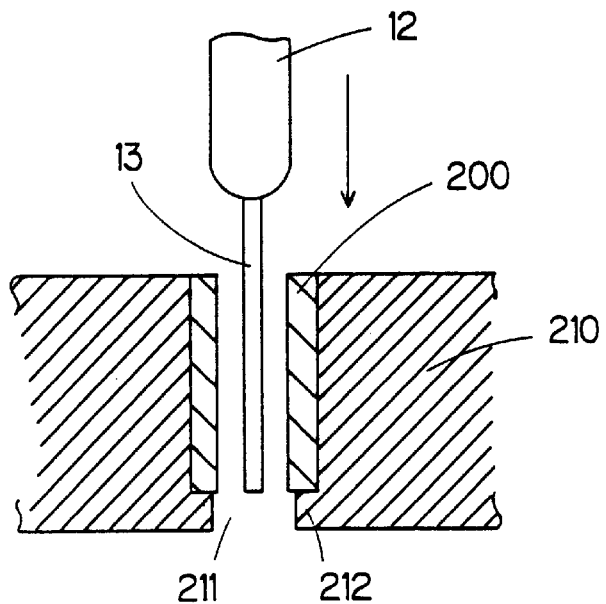
FIG. 9 is a cross sectional view of the state of the lead terminal under way of insertion in the through-hole fitted with the tube in the electrolytic capacitor of FIG. 8.

As shown in FIG. 9, furthermore, the tube 200 made of a material with a high elasticity modulus is fitted on the inner periphery of the through-hole 211, and the lead terminal 1 is inserted in the tube 200, while the external connection portion 13 of the lead terminal is drawn out from the other side, so that the tube 200 and the round rod portion 12 contact closely with each other due to the structure thereof.

In this case, herein, the inner face of the through-hole 211 is not bonded to the tube 200, so that the tube 200 is fitted in a movable manner relative to the through-hole 211. When the tube 200 is going to move in the through-hole 211 during the insertion of the lead terminal, the step part 212 functions as the fastening part suppressing the shift of the tube 200. Additionally, the opening of the outer case 30 is sealed with the tube 200 and the sealing body 210, while at a drawing process, the top of the opening is put in contact to the sealing body 210.

Figure 10:
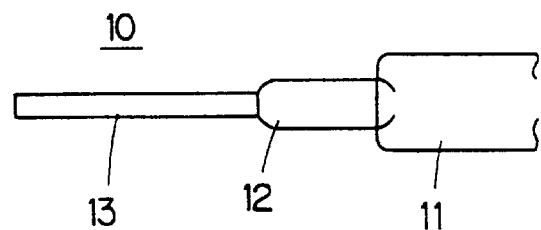
FIG. 10 is a view of the lead terminal fitted with tube in the electrolytic capacitor of FIG. 8, wherein (A) is a plain view; (B) is a front view; and (C) is a side view.
Figure 10:
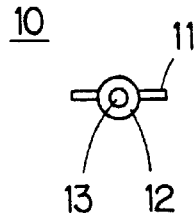
Figure 10:
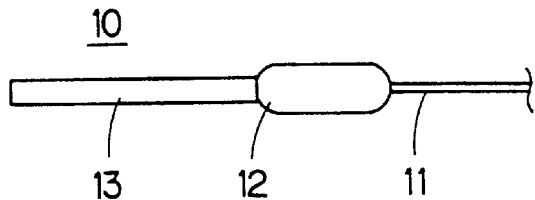

Alternatively, FIG. 10 is a view of the structure of the lead terminal 10, wherein (A) is a plain view; (B) is a front view and (C) is a side view. The lead terminal 10 shown in FIG. 10 comprises plain portion 11 for inner connection, round rod portion 12 for passing through the sealing body, and external connection portion 13, where the round rod portion 12 among them closely contacts with the tube 200 fitted in the through-hole 211 due to the structure thereof.

As the material composing the tube 200, herein, use is made of flexible materials listed for the tube 100 in the first embodiment (FIG. 1), namely materials with higher elasticity moduli, as selected from the group of flexible materials including rubber, fluorine resin, shrinkable tube, polyethylene, polyester, polyimide, polyamide, nylon, polyamide-imide, silicone resin, silicone rubber, poly-4-methylpentene-1 (crystallizable polyolefin), and ethylene vinyl alcohol. Particularly, a rubber with a higher elasticity modulus than conventional sealing rubbers is selected as the rubber material.

Figure 11:
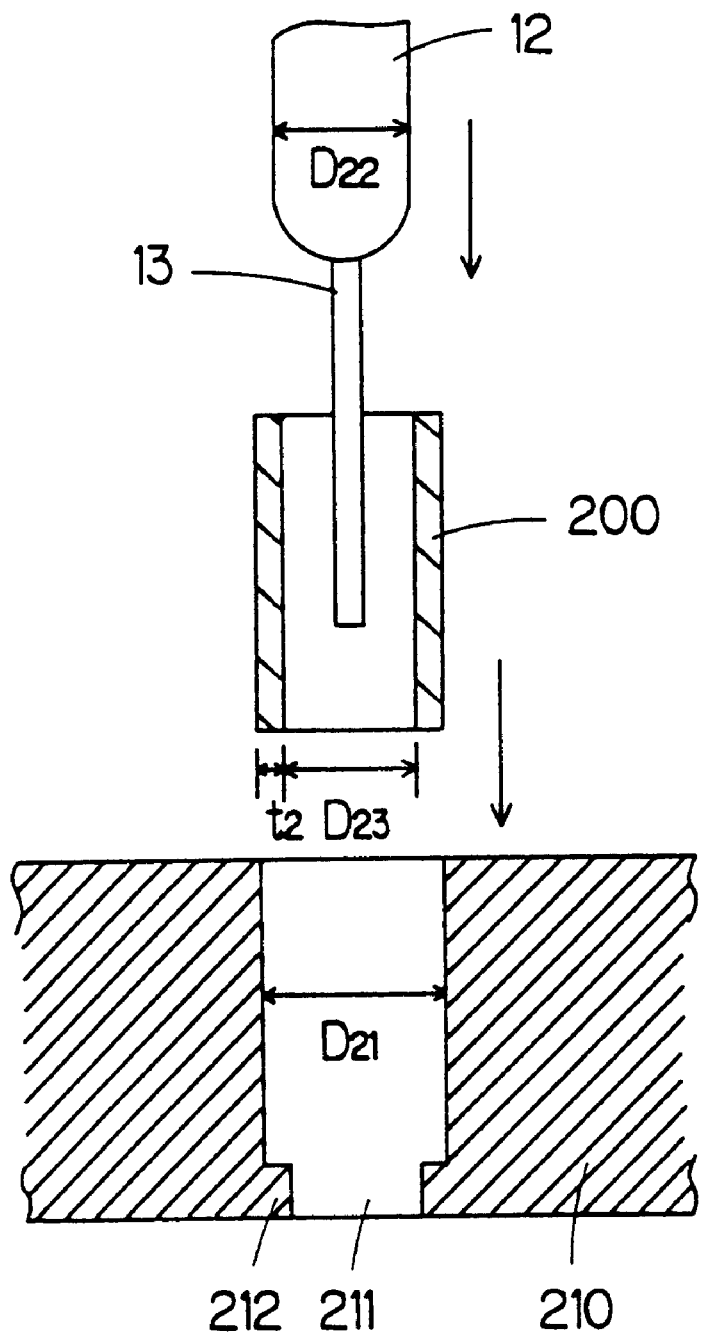
FIG. 11 is an explanatory view of the dimensional relation among the through-hole formed in the sealing body, the tube and the round rod portion of the lead terminal in the electrolytic capacitor of FIG. 8.

In this case, the dimensional relation among the tube 200, the through-hole 211 and the round rod portion 12 is as shown in FIG. 11, for the purpose of the elevation of the close contact between the round rod portion 12 and the sealing body 210. More specifically, provided that the diameter of the through-hole 211 formed in the sealing body 210 is designated $D_{21}$; the round rod diameter is designated $D_{22}$; and the tube thickness is designated $t_2$, their relation is represented by the following formula.

$$D_{21} - D_{22} < t_2 \times 2$$

In other words, the formula means that the inner diameter of the tube 200 when it has been fitted in the through-hole 211 is smaller than the diameter $D_{22}$ of the round rod portion 12.

By allowing the inner diameter of the tube 200 to be smaller than the diameter $D_{22}$ of the round rod portion 12, additionally, the close contact between the round rod portion 12 and the tube 200 can further be enhanced. In this case, given that the inner diameter of the tube 200 is $D_{23}$, the relation between the diameter $D_{22}$ of the round rod portion 12 and the inner diameter $D_{23}$ of the tube 200 can be expressed by the following formula.

$$D_{22} > D_{23}$$

2-2. Production Process of Electrolytic Capacitor

The electrolytic capacitor of FIG. 8 having the configuration described above can specifically be produced by the following procedures. First, the plain portions 11, 11 of a pair of the lead terminals 10, 10 are connected individually to both anode and cathode electrode foils; by winding both the anode and cathode electrode foils via a separator, capacitor element 20 is formed.

As shown in FIG. 9, subsequently, the tube 200 made of a material with a high elasticity modulus is fitted on the inner periphery of the through-hole 211 formed in the sealing body 210. By using an appropriate production machine and a long tube material in reel unit, more specifically, the tube material is continuously fed at an appropriate velocity. By sequentially cutting the tube material at a size for use as shown in FIG. 9, the predetermined tube 200 is prepared, which is then continuously fitted on the inner periphery of the through-hole 211 formed in the sealing body 210 (tube fitting step).

Continuously, the top part of each external connection portion of a pair of the lead terminals 10, 10 protruding from the capacitor element 20 is inserted in the tube 200, to move the lead terminal 10 relative to the tube 200; then, the whole external connection portion 13 is drawn out from the inside of the tube 200, to allow the tube 200 to closely contact with the outer periphery of the round rod portion 12 of the lead terminal 10. Subsequently, the capacitor element 210 integrated with the sealing body 210 is placed in the outer case 30; the sealing body 210 is then fitted on the opening of the outer case 30 to seal the outer case 30. As shown in FIG. 8, in this case, the opening of the outer case 30 is subjected to a drawing process, to put the top of the opening in contact to the sealing body 210.

2-3. Actions and Advantages

The electrolytic capacitor of the present embodiment and the process for producing the same have the following actions and advantages.

Because the sealing body 210 is made of a rigid material such as rigid resin, metal, rigid rubber, ceramic and glass, the gas permeability can be lowered, as in the case of the electrolytic capacitor of FIG. 1 in the first embodiment. Because the tube 200 made of a flexible material such as rubber, resin and shrinkable tube is fitted on the inner face of the through-hole 211 formed in the sealing body 210 and because the lead terminal 10 is inserted in and passes through the tube 200 and is then drawn out from the through-hole 211, the air tightness of the lead drawing part in the sealing body 210 can be further improved, as in the case of the electrolytic capacitor of FIG. 1.

Because the tube 200 is fitted in a movable manner in the through-hole 211 preliminarily formed in the sealing body 210, with no bonding to or imbedding in the sealing body 210, the tube can readily deform in an elongating fashion along the direction of the insertion of the lead terminal 10. During the insertion of the lead terminal 10, the tube 200 elongates in a manner sliding on the sealing body 210, depending on the compression of the tube 200 along the diameter direction, the volume of the tube 200 does not change. Consequently, the insertion process of the lead terminal 10 in the tube 200 is readily progressed because the pressure during the insertion of the lead terminal 10 is decreased owing to the elasticity of the tube 200. Additionally, such elongation of the tube 200 enables the dispersion of the stress, to establish sufficient close contact between the tube 200 and the round rod portion 12 of the lead terminal 10. Because the inner periphery face of the tube 200 and the outer periphery face of the round rod portion 12 can be secured to closely contact with each other over the entire surface in their contact region, due to the dimensional relation between the tube 200 and the round rod portion 12, the air tightness of the region can be enhanced.

Because the step part 212 protruding inward is formed in the inward face of the through-hole 211 on the lead terminal drawing side, the tube 200 is fastened with the step part 212 even when the tube 200 is pushed under pressure during the insertion of the lead terminal 10, so the tube 200 is never dissociated from the through-hole 211.

The tube 200 can readily deform during the insertion thereof in the through-hole 211 of the sealing body 210, so that the tube 200 and the through-hole 211 closely contact with each other. Because the tube 200 can readily deform in such fashion, as described above, the tube 200 of an outer diameter larger than the diameter of the through-hole 211 can be used, as described above. Because the outer periphery face of the tube 200 and the inner periphery face of the linear portion 214 of the through-hole 211 can be secured to closely contact with each other over the entire surface in their contact region, due to such dimensional relation, the air tightness of the region can be enhanced.

Because the tube 200 adhering to the round rod portion 12 elongates along the direction of the insertion of the round rod portion 12 of the lead terminal 10 when it is going to be inserted in the through-hole 211 of the sealing body 210, as described above, sufficient elasticity can be attained, so that even a tube with low gas permeability and a high elasticity modulus (high rigidity) can readily be inserted, by utilizing the elasticity. Hence, the gas permeability can sufficiently be lowered, depending on the material of the tube 200, while high air tightness can be attained.

Still furthermore, the top end of the opening of the outer case 30 put in contact to the sealing body 210 can suppress that the sealing body 210 springs out of the outer case 30, as in the case of the electrolytic capacitor of FIG. 1 according to the first embodiment. The electrolytic capacitor can readily be produced efficiently because the tube fitting process of the tube 200 can be carried out continuously by using a simple existing production machine and a long tube material in reel unit.

2-4. Modification Example

As a modification example of the sealing body 210 in the electrolytic capacitor of FIG. 8, furthermore, the inner diameter of the through-hole 221 of the sealing body 220 can structurally be equal wholly along the longitudinal direction.

When fitting the tube 200 made of a material with a high elasticity modulus on the inner periphery of the through-hole 221 of the sealing body 220, fastening member 222 with opening 223 of a diameter smaller than the diameter of the through-hole 221 is in contact to the lead drawing side of the sealing body 220 in such a concentric manner that the through-hole 221 and the opening 223 are in a concentric circle. When an pressure is loaded on the tube 200 along the insertion direction of the lead terminal 10 at the time of the insertion thereof, the dissociation of the tube 200 from the through-hole 221 can thereby be prevented. The tube fitting step can be carried out continuously by using an appropriate production machine and a long tube material in reel unit and supplying and cutting the tube material at a suitable velocity, as in the case of the description of the electrolytic capacitor of FIG. 8. After the tube fitting step, the tube 200 is allowed to closely contact with the outer periphery of the round rod portion 12 of the lead terminal 10, by inserting each of a pair of the lead terminals 10, 10 of the capacitor element 20 in the tube 200 and drawing each lead terminal out while the fastening member 222 is retained as it is on the lead drawing side of the sealing body 220. By removing the fastening member 222 on the lead drawing side of the sealing body 220, continuously, the capacitor element 20 integrated with the sealing body 220 is then placed in the outer case 30; the sealing body 220 is fitted in the opening of the outer case 30, followed by sealing of the outer case 30, so that the electrolytic capacitor shown in FIG. 12 can be completely prepared.

Figure 12:
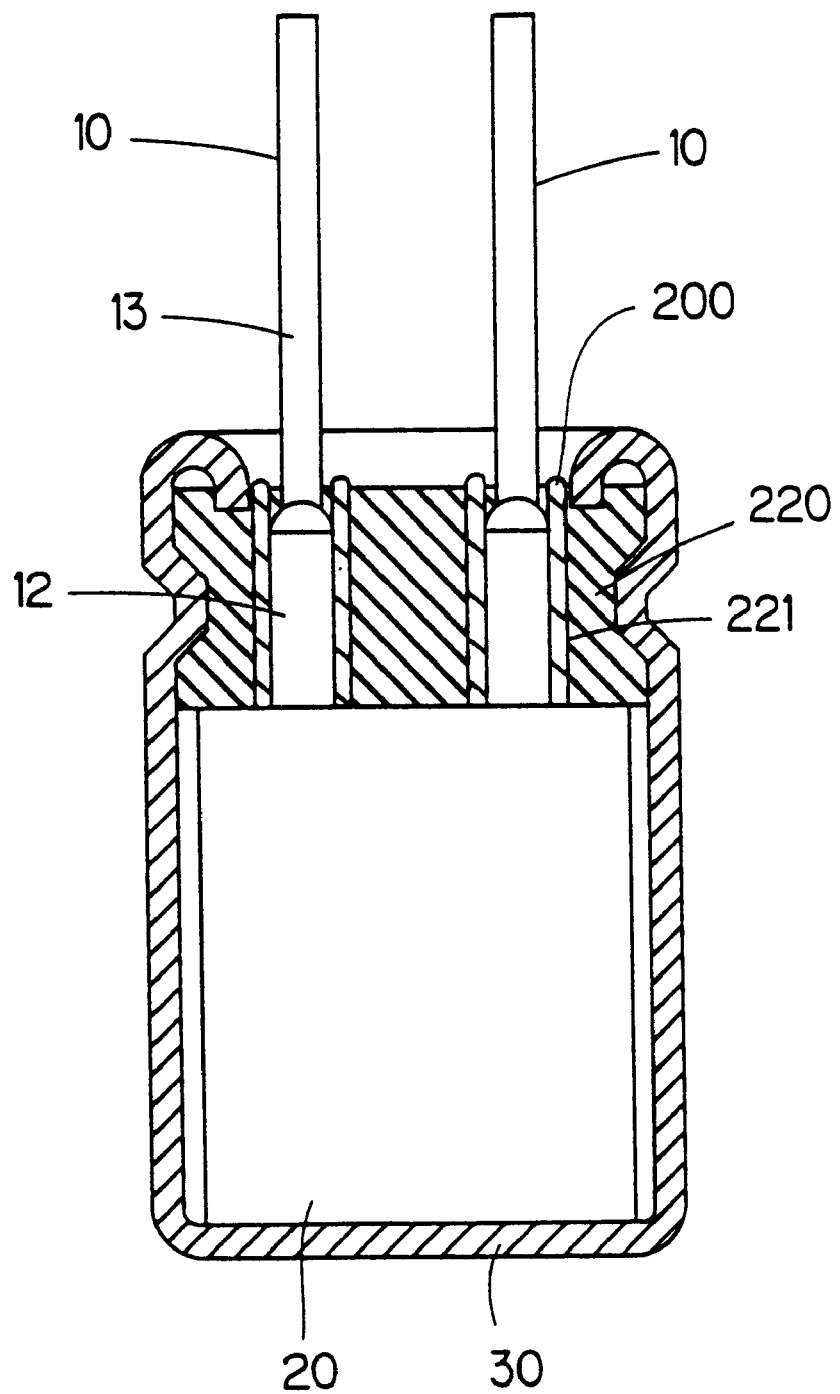
FIG. 12 is a cross sectional view of the configuration of another embodiment of the inventive electrolytic capacitor.

The electrolytic capacitor of FIG. 12 also brings about the same actions and advantages as those of the electrolytic capacitor of FIG. 8. Owing to the shape of the sealing body 220 and the use of the fastening member 222 of the shape, the following specific actions and advantages can be yielded.

Because the inner diameter of the through-hole 221 formed in the sealing body 220 is equal along the whole longitudinal direction, first, the step of forming the through-hole 221 in the sealing body 220 is more simplified, compared with the sealing body 210 provided with the step part 212 of FIG. 8. When the tube 200 is to be fitted in the through-hole 221, furthermore, the fastening member 222 with the opening 223 of a diameter smaller than the diameter of the through-hole 221 is placed in a manner that the through-hole 221 and the opening 223 are in a concentric circle, whereby the shift of the tube 200 can be suppressed by the fastening member 222 even when the tube 200 is pushed under pressure during the insertion of the lead terminal 10 along the insertion direction. Thus, the dissociation of the tube 200 from the through-hole 221 during the fitting of the tube 200 can be prevented. Furthermore, the fastening member 222 is removed after the tube 200 is fitted in the through-hole 221. Hence, an electrolytic capacitor in the same shape as those of conventional ones can be recovered.

Figure 14:
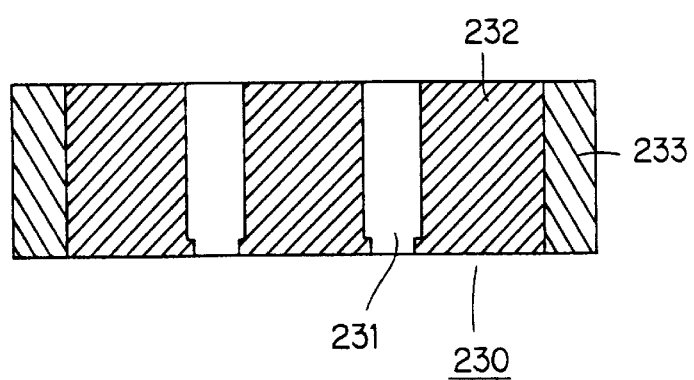
FIG. 14 is a cross sectional view of another configuration of the sealing body of the invention.

The sealing bodies 210, 220 comprise a single member in the electrolytic capacitors of FIGS. 8 and 12, but as shown in FIG. 14, the sealing unit can satisfactorily comprise plural members. Like the sealing body 110 of FIG. 1 in the first embodiment, the sealing body 230 of FIG. 14 comprises sealing plate 232 made of a metal or a resin with low gas permeability constant and elastic ring (outer periphery member) 233 made of a flexible material and being placed on the outer periphery thereof, wherein a pair of through-holes 231, 231 for drawing lead are provided on the sealing plate 232. In this case, further, a material selected from the groups listed above for the tube is used as the flexible material composing the elastic ring, while the inner diameter of the elastic ring 233 is deemed to be smaller than the outer diameter of the sealing plate 232.

The partition structure of the sealing body 230 of FIG. 14, comprising such sealing plate 232 and such elastic ring 233, is the same as the partition structure of sealing body 110 of FIG. 1, similarly comprising the sealing plate 112 and the elastic ring 113. In the sealing body 230 like the sealing body 110 of FIG. 1, accordingly, the elasticity of the elastic ring 233 can absorb the dimensional error of the sealing plate 232 even when the plate dimensionally varies more or less, so that the air tightness between the sealing body 230 and the outer case 30 can sufficiently be attained. Because the fitting of the elastic ring 233 in the sealing plate 232 can be continuously carried out at high efficiency, by using a long tube material as in the process of fitting the tube 200, additionally, the electrolytic capacitor can readily be produced at high efficiency.

Figure 15:
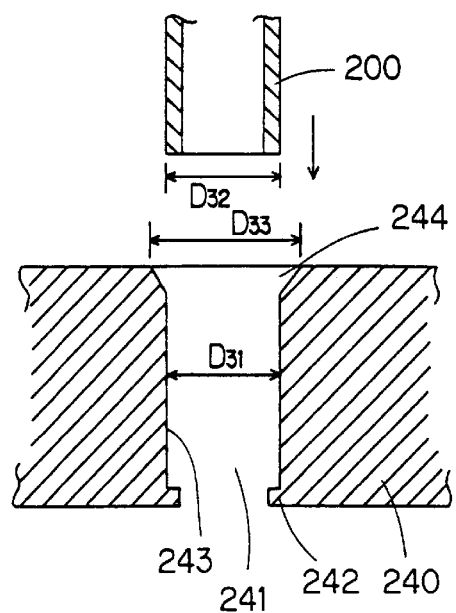
FIG. 15 is a cross sectional view of one example of another form of the through-hole formed in the sealing body of the invention.

In the electrolytic capacitor of FIG. 8, the cross sectional shape of the through-hole 211 in the sealing body 210 is a linear shape including the step part 212, while in the electrolytic capacitor of FIG. 12, the cross sectional shape of the through-hole 221 in the sealing body 220 is a simple linear shape. However, the cross sectional shape of the through-hole of the sealing body is not limited to these shapes. Other appropriate shapes can be selected. As shown in FIG. 15, for example, the through-hole 241 formed in the sealing body 240 possibly comprises step part 242, linear part 243 with a given diameter size, and insertion guide part 244 enlarging with a slope toward the opening end on the side of the insert inlet of the lead terminal 10. In such manner, the tube 200 can readily be inserted in the through-hole 241. In this case, furthermore, provided that the diameter of the linear part 243 of the through-hole 241 is designated $D_{31}$; the outer diameter of the tube 200 is designated $D_{32}$; and the maximum diameter of the insertion guide part 244 is designated $D_{33}$, their relation is expressed by the following formula.

$$D_{31} < D_{32} < D_{33}$$

2-5. Example

So as to specifically assess the life profile of the inventive electrolytic capacitor as described above, then, a conventional product simply using sealing rubber and the inventive product using the tube 200 and the sealing body 210 as shown in FIG. 8 were used to prepare individual electrolytic capacitors of the same rate 16 V-47 $\mu$F ($\phi$6.3×5L) in the same configuration, except for the sealing structure.

As the materials of the tube 200 and the elastic ring 213 of the sealing body 210 in the inventive product, a fluorine resin was used; the tube 200 was not bonded to but fitted in a movable manner on the inner face of the through-hole 211 formed in the sealing body 210. The conventional product (Comparative Example 2) and the inventive product (Example 2), thus prepared, were subjected to standing tests at 105° C. and 130° C. The change in the weight decrement, percentage volume change and tang over time was examined. The results are shown hereinbelow in Tables 3 and 4.

TABLE 3

Standing test at 105° C.

|  |  | Initial value | 500 hours later | 1000 hours later | 2000 hours later |
|---|---|---|---|---|---|
| Weight decrement | Comparative Example 1 | 0 | −2.7 mg | −5.0 mg | −12.0 mg |
|  | Example 1 | 0 | −0.6 mg | −1.4 mg | −3.0 mg |
| Percentage volume change | Comparative Example 1 | 46.7 μF | −3.0% | −7.0% | −15.0% |
|  | Example 1 | 47.2 μF | −2.7% | −6.0% | −7.0% |
| tanσ | Comparative Example 1 | 0.062 | 0.068 | 0.071 | 0.360 |
|  | Example 1 | 0.063 | 0.064 | 0.064 | 0.079 |

TABLE 4

Standing test at 130° C.

|  |  | Initial value | 500 hours later | 1000 hours later | 2000 hours later |
|---|---|---|---|---|---|
| Weight decrement | Comparative Example 1 | 0 | −11.0 mg | −18.0 mg | −25.0 mg |
|  | Example 1 | 0 | −1.1 mg | −2.2 mg | −4.2 mg |
| Percentage volume change | Comparative Example 1 | 46.5 μF | −13.0% | −85.0% | not measurable |
|  | Example 1 | 47.1 μF | −5.0% | −6.0% | −8.0% |
| tanσ | Comparative Example 1 | 0.062 | 0.280 | 100 | not measurable |
|  | Example 1 | 0.062 | 0.065 | 0.072 | 0.11 |

As apparently shown in Table 3, the weight decrement was −2.7 mg so early as 500 hours later in Comparative Example 2 and was as large as −12 mg, 2000 hours later, at the standing test at 105° C.; the percentage volume change was greatly decreased by −15% and the tanσ value was markedly increased to about 5-fold the initial value, 2000 hours later.

In Example 2, alternatively, the weight decrement was so small a value as −3 mg, 2000 hours later, while the percentage volume change was at about −7% and the tanσ value was slightly increased, compared with the initial value.

At the standing test at 105° C., as described above, the characteristic properties of Comparative Example 2 were deteriorated as early as 500 hours later and were severely deteriorated 2000 hours later. In Example 1, the characteristic properties thereof were retained at excellent values close to the initial values.

As apparently shown in Table 4, additionally, the weight decrement was −11 mg so early as 500 hours later in Comparative Example 2 at the standing test at 130° C., while the percentage volume change was decreased by −13% and the tanσ value was markedly increased to about 4.5-fold the initial value. 1000 hours later, furthermore, the weight decrement was −18 mg and the percentage volume change was significantly decreased by −85%, 1000 hours later. Thus, Comparative Example 2 can never be used. 2000 hours later, the weight decrement was as large as −25 mg and the percentage volume change or the tanσ value was never measurable, 2000 hours later.

In Example 2, on contrast, the weight decrement was as small as −2.2 mg and the percentage volume change was at about −6%, while the tanσ value was slightly increased from the initial value, 1000 hours later. 2000 hours later, additionally, the weight decrement was as small as −4.2 mg and the percentage volume change was at about −8%, while the tanσ value was about 1.7-fold the initial value.

As has been described above, significant deterioration of the characteristic properties of Comparative Example 2 was observed as early as 500 hours later; and Comparative Example 2 could never be used, 1000 hours alter. Example 1 retained excellent values close to the initial values, even 1000 hours later.

It is thus indicated that Example 2 has such an excellent life profile, particularly an excellent heat-resistant life profile, compared with Comparative Example 2. This demonstrates that an electrolytic capacitor with a stably high life profile owing to the inventive sealing structure prepared by fitting the tube made of a flexible material in a movable manner in the through-hole of the sealing body made of a rigid material.

3. Third Embodiment 3-1. Configuration of Electrolytic Capacitor

Figure 16:
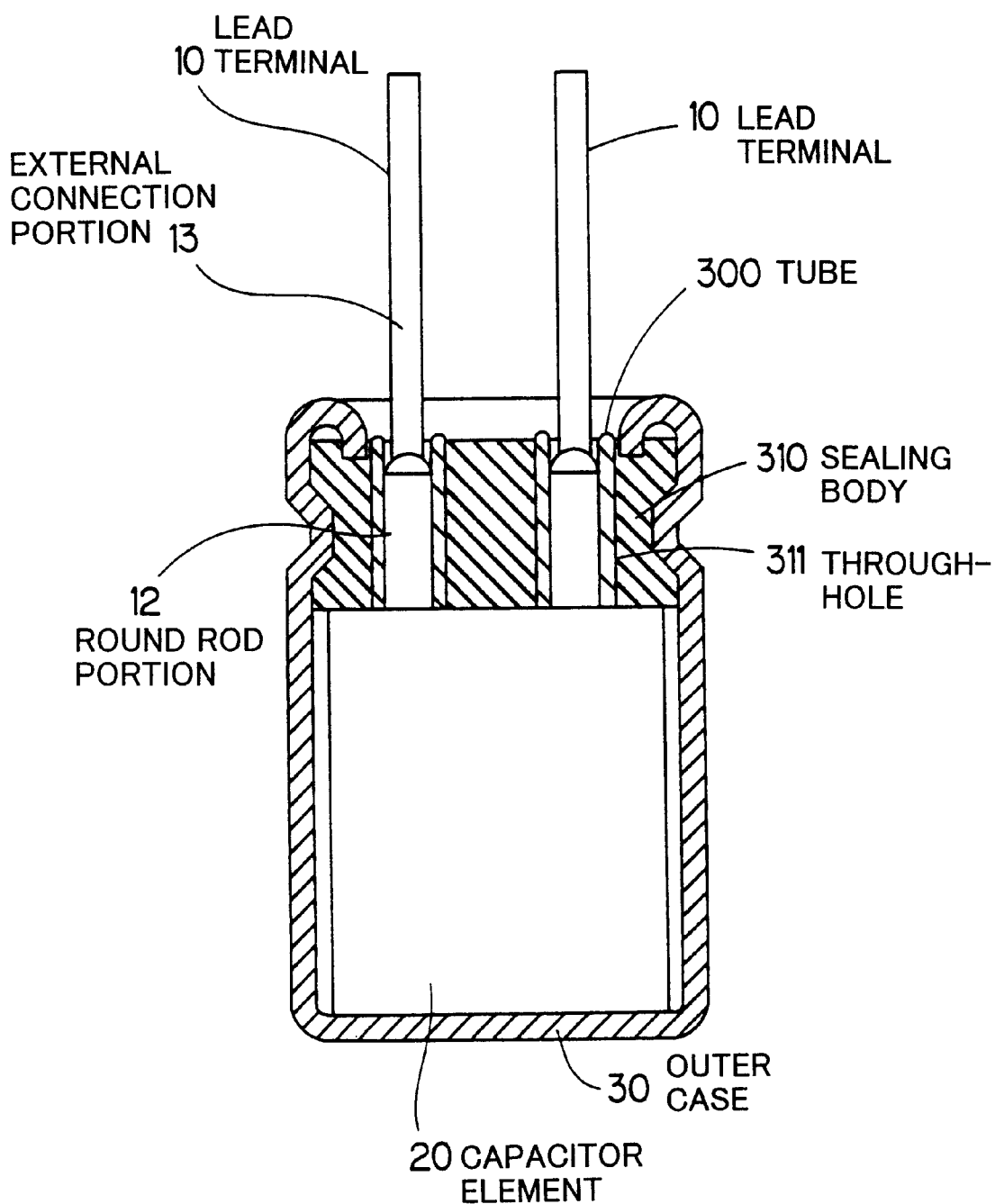
FIG. 16 is a cross sectional view of another embodiment of the electrolytic capacitor of the invention.

FIG. 16 is a cross sectional view of a third embodiment of the inventive electrolytic capacitor. As shown in FIG. 16, capacitor element 20 formed by winding both anode and cathode electrode foils connected with lead terminal 10 (electrode drawing unit) via a separator is placed in outer case 30 made of aluminium or the like in a bottomed cylindrical shape. Additionally, tube 300 made of a highly alkali-resistant resin is fitted on the outer periphery of the round rod portion 12 of the lead terminal 10; and the lead terminal 10 fitted with the tube 300 passes through the through-hole 311 of the sealing body 310 made of a highly alkali-resistant resin and being fitted on the inner periphery of the opening of the outer case 30 and is then drawn outside. More specifically, the opening of the outer case 30 is sealed with the tube 300 and the sealing body 310, while the top of the opening is in contact to the sealing body 310 at a drawing process. The sealing structure of FIG. 16, namely the sealing structure formed by inserting the lead terminal 10 fitted with the tube 300 in the through-hole 311 of the sealing body 310, is described in detail hereinbelow.

Firstly, the sealing body 310 fitted on the inner periphery of the opening of the outer case 30 comprises a single member as shown in FIG. 16, and at predetermined positions, a pair of through-holes 311, 311 are formed for drawing lead. Because highly basic hydroxide solutions leak outside from an electrolytic capacitor of electrolyte solutions using quaternary ammonium salt and quaternary-prepared cyclic amidinium salt as described above, conventionally used elastic rubber if used for composing the sealing body is deteriorated, to cause poor air tightness. In the electrolytic capacitor of FIG. 16, accordingly, the sealing body 310 is made of a highly alkali-resistant resin.

As the highly alkali-resistant resin composing the sealing body 310, furthermore, use is made of fluorine resin, polyethylene and the like. These materials can make contribution to the improvement of air tightness and are excellent in terms of processability and cost. As such fluorine resin, in particular, use is preferably made of a material selected from a group of:

PTFE (polytetrafluoroethylene),
TFE (tetrafluoroethylene),
FEP (tetrafluoroethylene-hexafluoropropylene copolymer),
PFA (tetrafluoroethylene-perfluoroalkylvinyl ether copolymer),
ETFE (ethylene-tetrafluoroethylene copolymer),
ECTFE (ethylene-chlorotrifluoroethylene copolymer), and
PCTFE (polychlorotrifluoroethylene).

Among fluorine resins, particularly, the use of the fluorine resins described above blocks the deterioration of the tube 300 and the sealing body 310, to thereby improve the air tightness of the lead drawing part. Additionally, the use thereof is excellent in terms of processability and cost.

Figure 17:
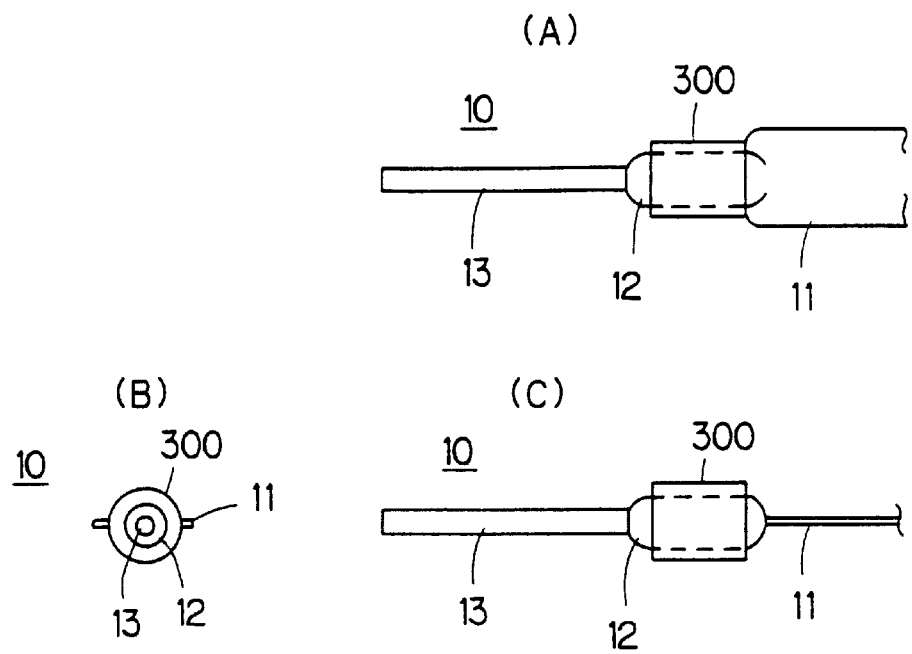
FIG. 17 is a view of the lead terminal fitted with the tube in the electrolytic capacitor of the invention, wherein (A) is a plain view; (B) is a front view; and (C) is a side view.

FIG. 17 is a view of the lead terminal 10 fitted with the tube 300, wherein (A) is a plain view; (B) is a front view; and (C) is a side view. As shown in FIG. 17, the lead terminal 10 comprises plain portion 11 for inner connection, round rod portion 12 for passing through the sealing body, and external connection portion 13, and the tube 300 made of a highly alkali- resistant resin is fitted on the round rod portion 12 among them. The reason why the tube is fitted not on the side of the sealing body 310 but on the side of the round rod portion 12 of the lead terminal 10 is as follows. Because the highly alkali-resistant resin composing the sealing body 310 is more rigid with a higher elasticity modulus than conventional sealing rubbers, more specifically, the close contact between the round rod portion 12 and the sealing body 310 is deteriorated when the round rod portion 12 is directly inserted in the through-hole 311 formed in the sealing body 310.

Figure 18:
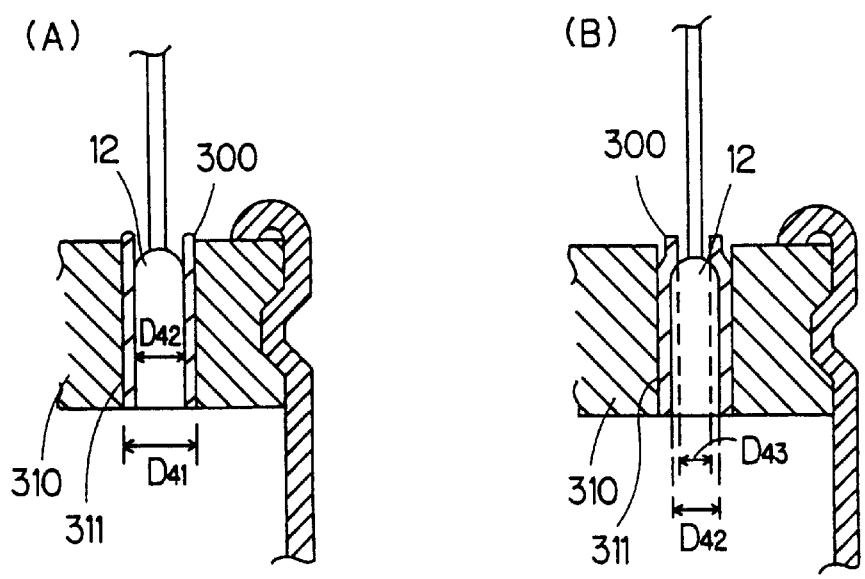
FIG. 18 is an explanatory view of the dimensional relation between the through-hole formed in the sealing body and the tube in the electrolytic capacitor of FIG. 16.

So as to enhance the close contact between the round rod portion 12 and the sealing body 310, in this case, the dimensional relation among the tube 300, the through-hole 311 and the round rod portion 12 is for example as shown in FIG. 18. More specifically, provided that the diameter of the through-hole 311 formed in the sealing body 310 is designated $D_{41}$; the diameter of the round rod portion 12 is designated $D_{42}$; and the tube thickness is designated $t_4$, their relation is represented by the following formula.

$$D_{41} - D_{42} < t_4 \times 2$$

In other words, the formula means that the outer diameter of the tube 300 when it has been fitted on the round rod portion 12 is larger than the diameter $D_{42}$ of the through-hole 311 of the sealing body 310.

By permitting the inner diameter of the tube 300 to be smaller than the diameter $D_{42}$ of the round rod portion 12, as shown in FIG. 18 (B), the close contact between the round rod portion 12 and the tube 300 can further be enhanced. In this case, given that the inner diameter of the tube 300 is $D_{43}$, the relation between the diameter $D_{42}$ of the round rod portion 12 and the inner diameter $D_{43}$ of the tube 300 can be expressed by the following formula.

$$D_{42} > D_{43}$$

As the highly alkali-resistant resin composing the tube 300, furthermore, use is made of fluorine resins and polyethylene and the like, as in the case of the sealing body 310. As the fluorine resin, additionally, a material selected from PTFE, TFE, FEP, PFA, ETFE, ECTFE, and PCTFE is particularly preferably used.

3-2. Production Process of Electrolytic Capacitor

Figure 19:
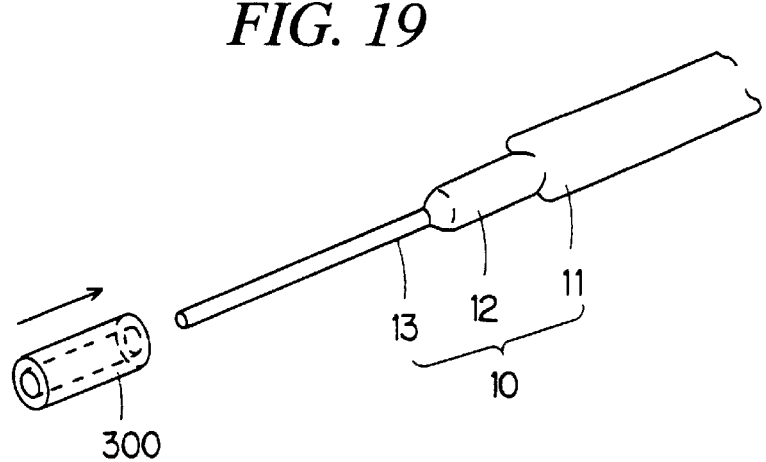
FIG. 19 is a perspective view of the tube fitting step of the production process of the electrolytic capacitor of FIG. 16.
Figure 20:
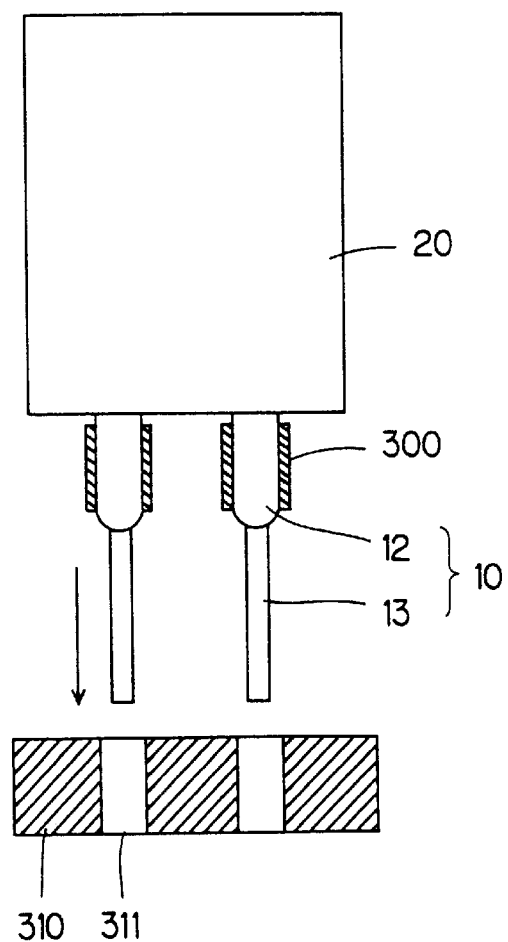
FIG. 20 is a cross sectional view of the subsequent electrode drawing step.

The electrolytic capacitor of FIG. 16 having the configuration described above can specifically be produced by almost the same procedures as for the electrolytic capacitor of FIG. 1, as apparently shown on comparison of FIGS. 19 and 20 with FIGS. 5 and 6. First, the plain portions 11, 11 of a pair of the lead terminals 10, 10 are individually connected to both anode and cathode electrode foils; by winding both the anode and cathode electrode foils via a separator, capacitor element 20 is formed.

As shown in FIG. 19, subsequently, each of a pair of the lead terminals 10, 10 protruding from the capacitor element 1 is inserted in the tube 300; by allowing both to make a relative move, the tube 300 is fitted on the outer periphery of the round rod portion 12 of the lead terminal 10. By using an appropriate production machine and a long tube material in reel unit and sequentially supplying and cutting the tube material at a suitable velocity, in the same manner as in the description of the electrolytic capacitor of FIG. 1, the tube fitting step can be effected continuously. As shown in FIG. 20, continuously, by inserting the lead terminal 10 fitted with the tube 300 in the through-hole 311 of the sealing body 310 and allowing both to make a relative move, the round rod portion 12 fitted with the tube 300 is fixed in the through-hole 311.

Subsequently, the capacitor element 1 is placed in the outer case 30, and the sealing body 310 is fitted on the opening of the outer case 30, to seal the outer case 30. As shown in FIG. 16, in this case, the opening of the outer case 30 is subjected to a drawing process, to put the top of the opening in contact to the sealing body 310.

3-3. Actions and Advantages

The electrolytic capacitor of the present embodiment and the process for producing the same have the following actions and advantages.

The tube 300 made of a highly alkali-resistant resin and the like is fitted on the round rod portion 12 of the lead terminal 10 and the lead terminal 10 fitted with the tube 300 is drawn out through the through-hole 311 of the sealing body 300. Hence, the tube 300 is not bonded to or imbedded in the sealing body 300. Because the tube 300 deforms in an elongating fashion along the insertion direction of the lead terminal 10 and then closely contacts with the through-hole 311, due to the pressure loaded during the insertion of the lead terminal 10, as in the case of the electrolytic capacitor of FIG. 1 in the first embodiment, the air tightness of the lead drawing part of the sealing body 310 can greatly be enhanced. Because the tube 300 can move along the insertion direction and can function as a safety valve, additionally, the safety profile of the resulting electrolytic capacitor can furthermore be improved.

Figure 13:
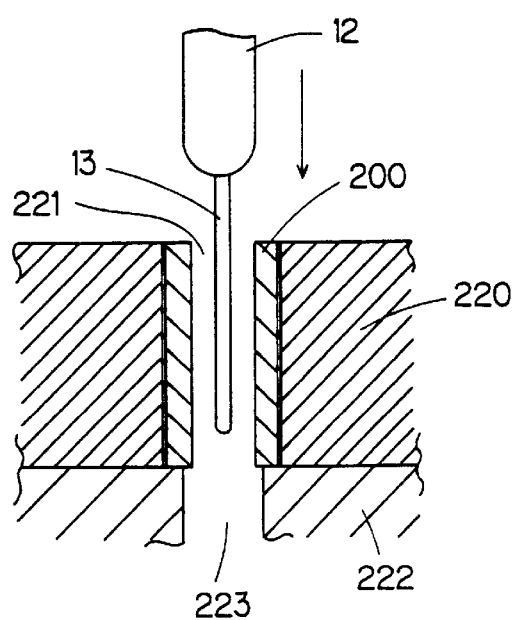
FIG. 13 is a cross sectional view of the state of the lead terminal under way of insertion in the through-hole fitted with the tube in the electrolytic capacitor of FIG. 12.

Because the sealing body 310 particularly is made of a highly alkali-resistant resin in the electrolytic capacitor of FIG. 13, the deterioration of the sealing body 310, particularly the tube 300 fitted on the lead terminal on the cathode side can be prevented, even when a strongly basic hydroxide solution is generated.

Additionally because the top of the opening of the outer case 30 is in contact to the sealing body 310, it can be suppressed for the sealing body 310 to spring out of the outer case 30, as in the case of the electrolytic capacitors of FIGS. 1 and 8 of the first and second embodiments, respectively. Because the process of fitting the tube 300 can continuously be carried out efficiently, by using a simple existing production machine and a long tube material in reel unit, the electrolytic capacitor can readily be produced efficiently.

3-4. Modification Example

The sealing body 310 in the electrolytic capacitor of FIG. 16 is made of a highly alkali-resistant resin, but the sealing unit of the invention is not limited thereto. The sealing unit can satisfactorily comprise a rigid material conventionally used.

The reason is as follows; because the tube made of an alkali-resistant resin is fitted on the outer periphery of the round rod portion of at least the electrode drawing unit on the cathode side in the inventive electrolytic capacitor, any highly basic hydroxide ion if generated in the proximity of the electrode drawing unit on the cathode side scarcely affects the sealing unit in the inventive electrolytic capacitor, owing to the aforementioned mechanism. It is needless to say that as in the embodiment, further, more excellent effects can be brought about when the sealing body 310 is made of a highly alkali-resistant resin.

Figure 21:
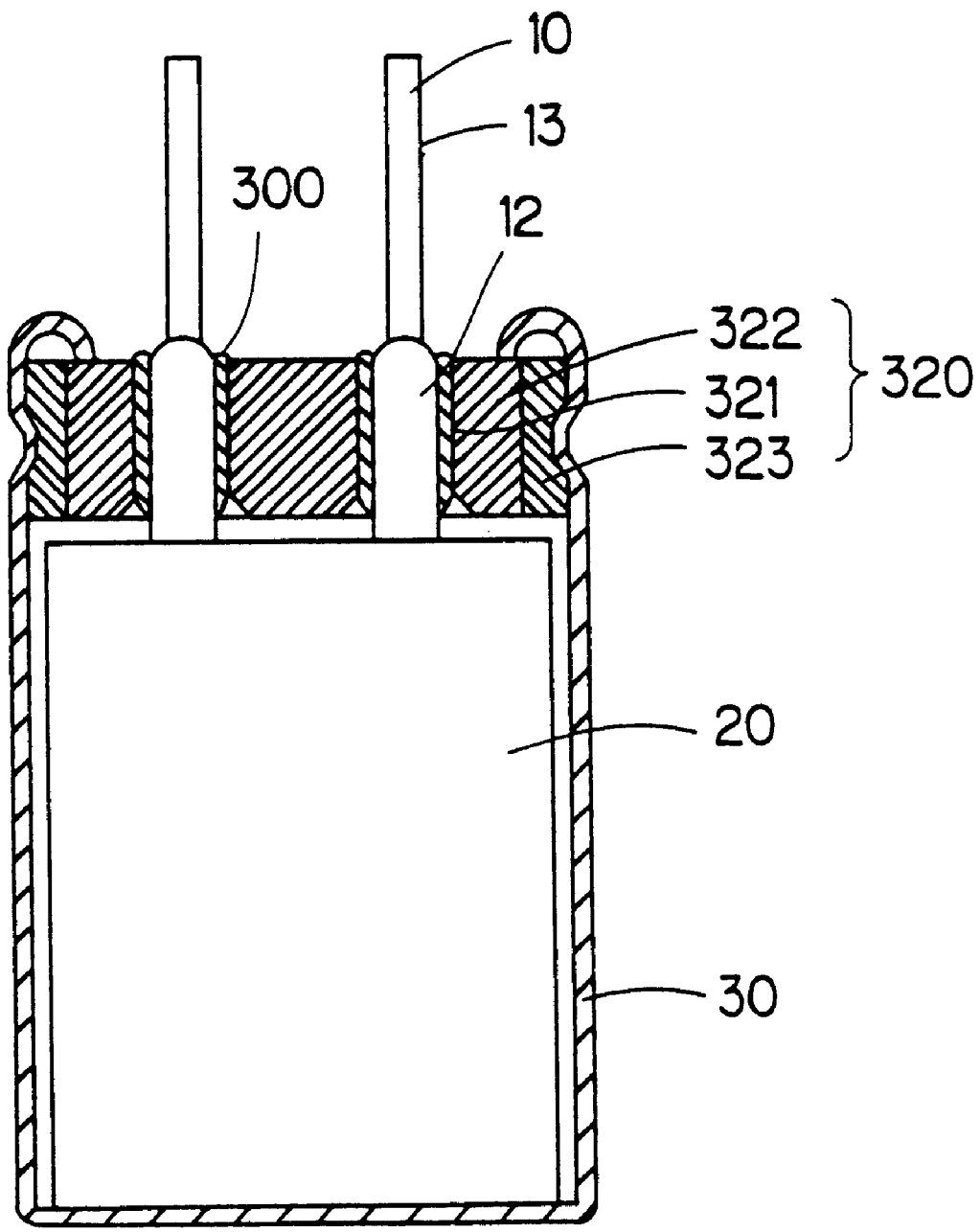
FIG. 21 is a cross sectional view of another embodiment of the electrolytic capacitor of the invention.
Figure 22:
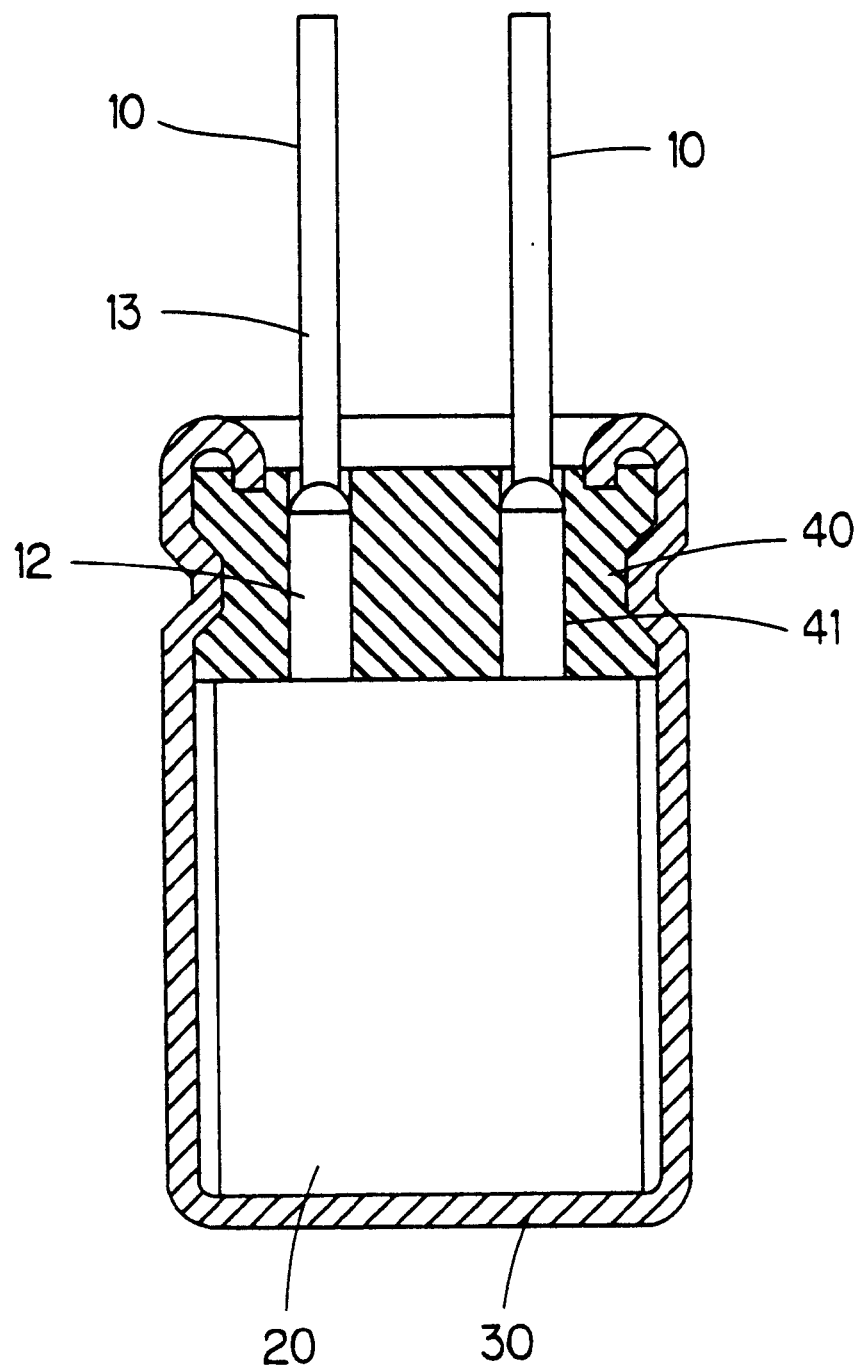
FIG. 22 is a cross sectional view of the structure of an electrolytic capacitor for conventional use.
Figure 23:
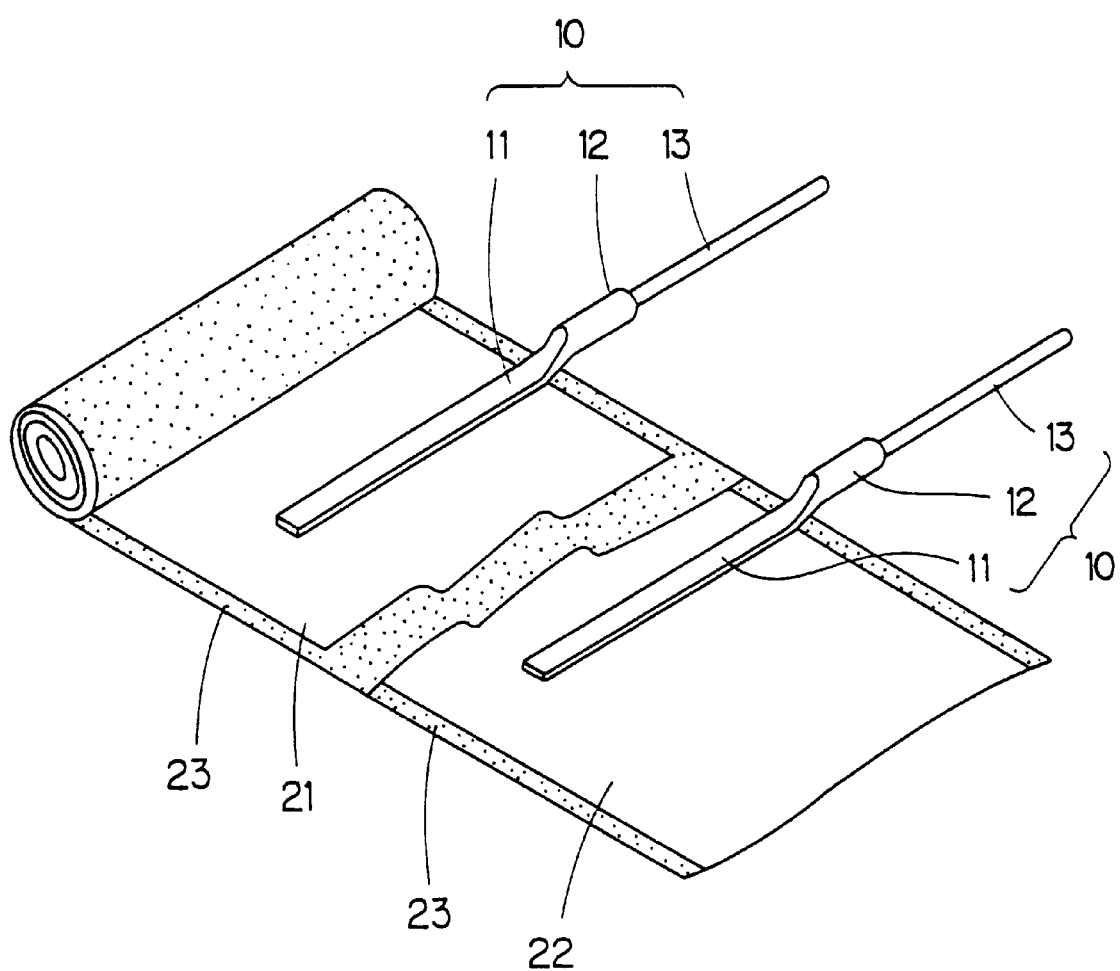
FIG. 23 is a perspective decomposition view explaining the structure of the capacitor element and the formation step thereof.
Figure 24:
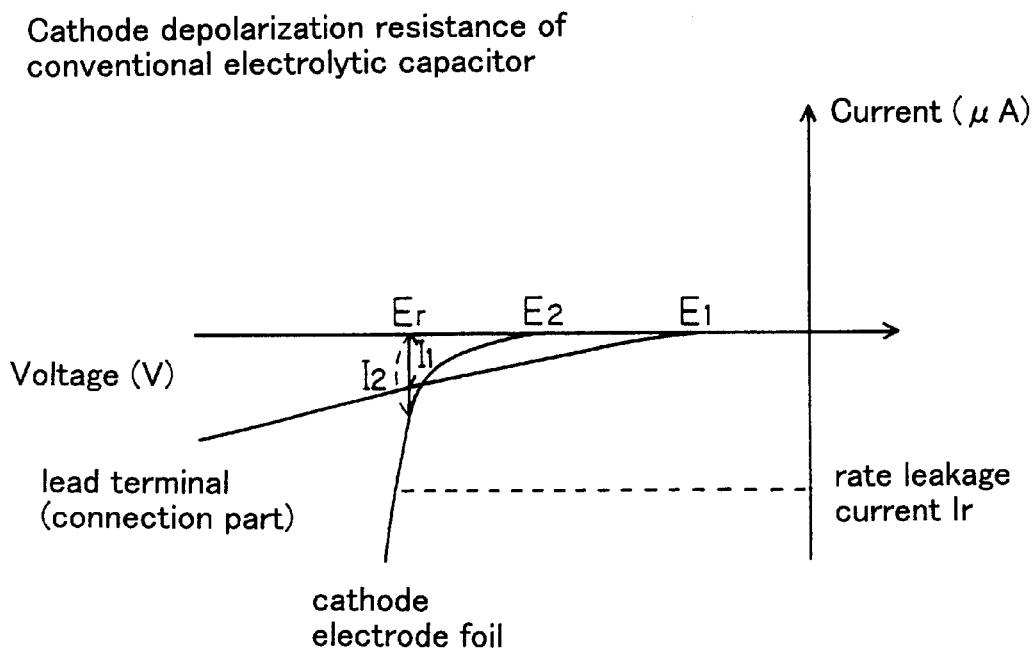
FIG. 24 shows graphs of the cathode depolarization resistance at the cathode of the conventional electrolytic capacitor using an electrolyte solution containing quaternary ammonium salt.

The sealing body 310 in the electrolytic capacitor of FIG. 16 singly is made of a highly alkali-resistant resin, but the sealing unit possibly comprises plural members, as shown in FIG. 21. The sealing body 320 of FIG. 21 comprises sealing plate 322 made of a highly alkali-resistant resin and elastic ring 323 (outer periphery member) made of a flexible material fitted on the outer periphery, and a pair of through-holes 321, 321 are provided on the sealing plate 322 for drawing lead.

The partition structure of the sealing body 320 of FIG. 21, comprising such sealing plate 322 and such elastic ring 323 is the same as the partition structure of the sealing body 110 of FIG. 1, comprising the sealing plate 112 and the elastic ring 113. AS in the case of the sealing body 110 of FIG. 1, the elasticity of the elastic ring 323 can absorb the dimensional error of the sealing plate 322 made of a highly alkali-resistant resin even when the sealing plate 322 is more or less at a dimensional variation in the sealing body 320, so that the air tightness between the sealing body 320 and the outer case 30 can sufficiently be attained. Like the process of fitting the tube 300, the process of fitting the elastic ring 323 on the sealing plate 322 can efficiently be carried out, continuously, by using a long tube material. Therefore, the electrolytic capacitor can readily be produced efficiently.

In the electrolytic capacitor of FIG. 16, the cross sectional shape of the through-hole 311 of the sealing body 310 is a linear shape, but the cross sectional shape of the through-hole of the sealing body is not limited thereto. Other appropriate shapes can be selected. Like the through-hole 111 of the sealing body 110 of FIG. 1, the through-hole 311 possibly comprises a linear part with a constant diameter size and an insertion guide part enlarging with a slope toward the opening end on the side of the insertion inlet of the lead terminal 10. In this case, additionally, the round rod portion 12 of the lead terminal 10 fitted with the tube 300 can readily be inserted in the through-hole of the sealing body. In this case, furthermore, provided that the diameter of the linear part of the through-hole is designated $D_{51}$; the outer diameter of the tube 300 when it has been fitted on the round rod portion 12 is designated $D_{52}$; and the maximum diameter of the insertion guide part is designated $D_{53}$, their relation is expressed by the following formula.

$$D_{51} < D_{52} < D_{53}$$

Further, such insertion guide part can be provided on both the upper and lower faces of the sealing body. In this case, the air tightness between the tube 300 and the through-hole can sufficiently be produced; and the lead terminal fitted with the tube 300 can readily be inserted from any of the faces of the sealing body. Thus, the processability can be improved.

Like the through-hole 121 of the sealing body 120 of FIG. 7, the through-hole of the sealing body comprises a linear part at a constant diameter size approximately the same as the outer diameter size of the tube 300 when it has been fitted on the round rod portion 12 and a small-diameter part provided in the center. Even in this case, the air tightness between the tube 300 and the through-hole can sufficiently be attained; and the lead terminal fitted with the tube 300 can readily be inserted from any of the faces of the sealing body. Thus, the processability can be improved.

3-5. Example

So as to assess the presence or absence of the leakage of electrolyte solutions from the inventive electrolytic capacitor, a conventional product simply using sealing rubber and the inventive product using the tube 300 and the sealing body 310 as shown in FIG. 16 were prepared, for comparative tests.

In both the conventional example and the inventive product, an electrolyte solution of the quaternary ammonium salt of carboxylic acid was used; and they were of the same configuration except for the sealing structures thereof. Twenty-five electrolytic capacitors of each of the conventional example and the inventive product at the same rate 6.3 V-100 $\mu$F ($\phi$6.3×5 L) were prepared. The thus prepared conventional product (Comparative Example 3) and the inventive product (Example 3) were left to stand at 105° C. for 1000, 2000, and 3000 hours. The presence or absence of the subsequent leakage of the electrolyte solution was visually observed. The results are shown below in Table 5.

Table 5

Number of electrolytic capacitors with the occurrence of liquid leakage under visual observation

|  | 1000 hours | 2000 hours | 3000 hours |
| --- | --- | --- | --- |
| Comparative Example 3 | 0/25 | 4/25 | 6/25 |
| Example 3 | 0/25 | 0/25 | 0/25 |

As apparently shown in Table 5, it was observed that liquid leakage occurred in 16% (4/25) of the products of Comparative Example 3 after left to stand for 2000 hours and that liquid leakage occurred in 24% (6/25) of the products of Comparative Example 3 after left to stand for 3000 hours. On contrast, no liquid leakage occurred in any product of Example 3 even after left to stand for 3000 hours.

It is thus indicated that Example 3 can retain high air tightness over a long period, compared with Comparative Example 3. This demonstrates that the inventive sealing structure was prepared by inserting the lead terminal fitted with the tube made of a highly alkali-resistant resin in the through-hole of the sealing body enables the production of an electrolytic capacitor with a stably high life profile.

4. Other Embodiments

The present invention is not limited to the aforementioned individual embodiments but can be carried out in various diverse embodiments within the scope of the invention. In the individual embodiments, first, specific materials are listed for the flexible material composing the lead or the elastic ring of the sealing body, but the flexible material of the invention is not limited to them. Additionally, various diverse flexible materials can be used. In the individual embodiments, similarly, specific materials are listed for the rigid material composing the sealing body and the sealing plate, but the rigid material for use in the sealing body and the sealing plate is not limited to them, in accordance with the invention. Additionally, various diverse rigid materials can be used. For the electrolytic capacitor of FIG. 16, specific materials are listed for the highly alkali-resistant resin composing the tube or the sealing body, but the highly alkali-resistant resin is not limited to them, in accordance with the invention. Besides, various diverse materials can be used.

Furthermore, the shape of the through-hole provided in the sealing body can be selected freely. More specifically, the specific dimension and shape of the sealing unit and the material thereof can freely be selected, while the specific air-tight structure between the outer case and the sealing unit can freely be selected. Additionally, the specific dimensions and shapes of the outer case and the electrode drawing unit and the materials thereof can be selected freely.

INDUSTRIAL APPLICABILITY

As has been described above, the invention provides an electrolytic capacitor comprising a tube for retaining air tightness being placed in a movable manner relative to the through-hole, between the through-hole of the sealing unit and the round rod portion of the electrode drawing unit. More specifically, the tube made of a flexible material is fitted in a movable manner on the side of the electrode drawing unit to insert the electrode drawing unit fitted with the tube in the through-hole of the sealing unit; otherwise, the tube is alternatively fitted in a movable manner on the side of the through-hole of the sealing unit and then, the electrode drawing unit is inserted in the through-hole. In case that an electrolyte solution containing quaternary ammonium salt or quaternary-prepared amidinium salt is used as the electrolyte solution, a tube made of an alkali-resistant resin is fitted in a movable manner on the outer periphery of the round rod portion of at least the electrode drawing unit on the cathode side and then, the round rod portion fitted with the tube is inserted in the through-hole of the sealing unit.

In any case, the tube deforms in an elongating fashion, utilizing the pressure during the insertion of the electrode drawing unit in the through-hole, so that the tube and the round rod portion can closely contact with each other and the tube and the through-hole can closely contact with each other. Thus, the air tightness in the part through which the electrode drawing unit passes can be enhanced.

In case that the tube made of an alkali-resistant resin is fitted on the round rod portion of at least the electrode drawing unit on the cathode side in the electrolytic capacitor using an electrolyte solution containing quaternary ammonium salt or quaternary-prepared amidinium salt, the deterioration of the part through which the electrode drawing unit on the cathode side passes and where the basicity readily increases can effectively be prevented, so that the air tightness between the round rod portion and the sealing unit can be improved.

In accordance with the invention, the highly air-tight sealing structure comprising the sealing unit and the tube in combination is provided, so that an excellent electrolytic capacitor with such stably high life profile and with a potential to make contribution to the improvement of production efficiency and the reduction in production cost can be provided. Additionally, the tube can efficiently be fitted, continuously, by using a simple existing production machine and a long tube material in reel unit. Hence, the inventive electrolytic capacitor can be produced efficiently at low cost.

What is claimed is:

1. An electrolytic capacitor comprising a capacitor element formed by winding both anode and cathode electrode foils connected with electrode drawing units via a separator, an outer case having a cylindrical shape with a closed bottom end for placing the capacitor element therein, and a sealing unit fitted on the opening of the outer case, wherein the electrode drawing unit comprises a plain portion for inner connection, a round rod portion for passing through the sealing unit, and an external connection portion, and wherein the electrode drawing unit is drawn through a through-hole provided on the sealing unit outside the outer case, the capacitor comprising:

a tube made of a flexible material for retaining air tightness, being placed between the through-hole of the sealing unit and the round rod portion of the electrode drawing unit;

a part including at least the through-hole of the sealing unit, the part being made of a rigid material more rigid than the tube, and the tube being movable relative to the through-hole and the round rod portion so as to allow the tube to be compressed between the through-hole and the round rod portion;

wherein the tube for retaining air tightness is made of a flexible material and fitted in a movable manner on the outer periphery of the round rod portion;

the inner diameter of the tube is smaller than the outer diameter of the round rod portion of the electrode drawing unit; and the outer diameter of the tube is larger than the diameter of the through-hole of the sealing unit when the tube has been fitted on the round rod portion of the electrode drawing unit.

2. An electrolytic capacitor according to claim 1, wherein the diameter size of the through-hole is at a value obtained by subtracting 5% to 100% of the thickness size of the tube from the outer diameter size of the tube when it has been fitted on the round rod potion of the electrode drawing unit.

3. An electrolytic capacitor according to claim 1, wherein the diameter of at least the opening end of the through-hole on the side of the insertion inlet of the electrode drawing unit is larger than the diameter in the central part thereof.

4. An electrolytic capacitor according to claim 1, wherein the sealing unit comprises a sealing plate made of the rigid material and an outer periphery member made of a flexible material fitted on the outer periphery of the sealing plate.

5. An electrolytic capacitor according to claim 4, wherein the outer periphery member of the sealing unit is formed in a tube-like shape and the inner diameter of the outer periphery member is smaller than the outer diameter of the sealing plate.

6. An electrolytic capacitor according to claim 1, wherein the flexible material is a material selected from rubber, fluorine resin, shrinkable tube, polyethylene, polyester, polyimide, polyamide, nylon, polyamide-imide, silicone resin, silicone rubber, poly-4-methylpentene-1 (crystallizable polyolefin), and ethylene vinyl alcohol.

7. An electrolytic capacitor according to claim 1, wherein the rigid material is a material selected from a resin material group including fluorine resin, polyphenylene sulfide, nylon, phenol, epoxy, polysulfone, polyimide, polyamide-imide, polyoxybenzylene polyethylene, polypropylene, and polycarbonate; and a metal material group including aluminium, tantalum, magnesium, copper, nickel, titanium or alloys thereof; rigid rubber, ceramic and glass.

8. An electrolytic capacitor according to claim 7, wherein an insulation layer is formed on the surface of a metal material when the material is selected as the sealing unit from the metal material group.

9. An electrolytic capacitor according to claim 1, wherein the top of the outer case opening is put in contact to the sealing unit through a drawing process.

10. A method for producing an electrolytic capacitor comprising an element formation step of forming a capacitor element by winding both anode and cathode electrode foils connected with electrode drawing units via a separator and an assembly step of sealing the capacitor element in an outer case having a cylindrical shape with a closed bottom end, wherein an electrode drawing unit comprising a plain portion for inner connection, a round rod portion for passing through a sealing unit and an external connection portion, is used as the electrode drawing unit, wherein the assembly step comprises:
   a tube fitting step of inserting the electrode drawing unit in a tube made of a flexible material and fitting the tube on the outer periphery of the round rod portion; and
   an electrode drawing step of inserting the electrode drawing unit fitted with the tube as prepared at the tube fitting step into a through-hole of a sealing unit made of a rigid material more rigid than the tube, wherein the tube is movable relative to the through-hole and the round rod portion, to draw the external connection portion from the through-hole and compress the tube between the through-hole and the round rod portion.

11. A method for producing an electrolytic capacitor according to claim 10, further comprising a second tube fitting step of fitting an outer periphery member made of a flexible material on the outer periphery of a sealing plate made of the rigid material, so as to form the sealing unit.

12. A method for producing an electrolytic capacitor according to claim 10, wherein the tube fitting step further comprises continuously supplying a longer tube material than the size for use of the tube to be fitted and sequentially cutting the tube material at the size for use.

13. An electrolytic capacitor according to claim 1, wherein the sealing unit comprises a sealing plate made of the rigid material and an outer periphery member made of a flexible material fitted on the outer periphery of the sealing plate.

14. An electrolytic capacitor according to claim 13, wherein the outer periphery member of the sealing unit is formed in a tube-like shape and the inner diameter of the outer periphery member is smaller than the outer diameter of the sealing plate.

15. A method for producing an electrolytic capacitor comprising an element formation step of forming a capacitor element by winding both anode and cathode electrode foils connected with electrode drawing units via a separator and an assembly step of sealing the capacitor element in an outer case having a cylindrical shape with a closed bottom end, wherein an electrode drawing unit comprising a plain portion for inner connection, a round rod portion for passing through a sealing unit and an external connection portion, is used as the electrode drawing unit, wherein the assembly step comprises:
   a tube fitting step of fitting a tube made of a flexible material in a through-hole of a sealing unit made of a rigid material more rigid than the tube; and
   an electrode drawing step of inserting the round rod portion of the electrode drawing unit into the through-hole fitted with the tube as prepared at the tube fitting step, in a movable manner between the tube and the through-hole and between the tube and the round rod portion, to draw the external connection portion from the through-hole and compress the tube between the through-hole and the round rod portion.

16. A method for producing an electrolytic capacitor according to claim 15, further comprising a step part formation step of forming a step part protruding inward on the inner face of the electrode drawing side of the through-hole provided on the sealing unit, prior to the tube fitting step.

17. A method for producing an electrolytic capacitor according to claim 15, further comprising a fastening member attachment step for attaching a fastening member with an opening of a smaller diameter than the diameter of the through-hole, on the electrode drawing side of the sealing unit, wherein the tube fitting step and the electrode drawing step are carried out by using the fastening member.

18. A method for producing an electrolytic capacitor according to claim 15, further comprising a second tube fitting step of fitting an outer periphery member made of a flexible material on the outer periphery of the sealing plate made of the rigid material, so as to form the sealing unit.

19. A method for producing an electrolytic capacitor according to claim 15, wherein the tube fitting step additionally comprises continuously supplying a longer length of tube material than the size of tube material for use as the tube to be fitted and sequentially cutting the tube material at the size for use.

20. An electrolytic capacitor according to claim 1, wherein:
   the capacitor element is impregnated with an electrolyte solution containing either one of quaternary ammonium salt or quaternary-prepared amidinium salt;
   a tube made of an alkali-resistant resin is fitted in a movable manner on the outer periphery of the round rod portion of at least the electrode drawing unit on the cathode side among the electrode drawing units; and
   the round rod portion fitted with the tube is inserted in the through-hole of the sealing unit.

21. An electrolytic capacitor according to claim 20, wherein:
   the inner diameter of the tube is smaller than the outer diameter of the round rod portion of the electrode drawing unit; and
   the outer diameter of the tube is larger than the diameter of the through-hole of the sealing unit when the tube has been fitted on the round rod portion of the electrode drawing unit.

22. An electrolytic capacitor according to claim 20, wherein the diameter of at least the opening end of the through-hole on the side of the insertion inlet of the electrode drawing unit is larger than the diameter in the central part thereof.

23. An electrolytic capacitor according to claim 20, wherein the sealing unit comprises a sealing plate with the through-hole provided therein and an outer periphery member made of a flexible material fitted on the outer periphery of the sealing plate.

24. An electrolytic capacitor according to claim 20, wherein the outer periphery member of the sealing unit is formed in a tube-like shape and the inner diameter of the outer periphery member is smaller than the outer diameter of the sealing plate.

25. An electrolytic capacitor according to claim 20, wherein the sealing unit is made of an alkali-resistant resin.

26. An electrolytic capacitor according to claim 20, wherein the alkali-resistant resin is a material selected from a fluorine resin and polyethylene.

27. An electrolytic capacitor according to claim 26, wherein the fluorine resin is a material selected from a group of:

PTFE (polytetrafluoroethylene),

TFE (tetrafluoroethylene),

FEP (tetrafluoroethylene-hexafluoropropylene copolymer),

PFA (tetrafluoroethylene-perfluoroalkylvinyl ether copolymer),

ETFE (ethylene-tetrafluoroethylene copolymer),

ECTFE (ethylene-chlorotrifluoroethylene copolymer), and

PCTFE (polychlorotrifluoroethylene).

28. A method for producing an electrolytic capacitor comprising an element formation step of forming a capacitor element by winding both anode and cathode electrode foils connected with electrode drawing units on the anode side and on the cathode side via a separator and an electrolyte solution impregnation step of impregnating the capacitor element with an electrolyte solution containing quaternary ammonium salt or quaternary-prepared amidinium salt, and an assembly step of sealing the capacitor element in an outer case having a cylindrical shape with a closed bottom end, wherein an electrode drawing unit comprising a plain portion for inner connection, a round rod portion for passing through a sealing unit and an external connection portion, is used as the electrode drawing unit, wherein the assembly step comprises:

a tube fitting step of inserting at least the electrode drawing unit on the cathode side among the electrode drawing units in the tube made of an alkali-resistant resin to arrange the tube on the outer periphery of the round rod portion; and an electrode drawing step of inserting the electrode drawing unit fitted with the tube as prepared at the tube fitting step, into a through-hole of a sealing unit made of a rigid material more rigid than the tube, in a movable manner between the tube and the through-hole and between the tube and the round rod portion, to draw the external connection portion from the through-hole and compress the tube between the through-hole and round rod portion.

29. A method for producing an electrolytic capacitor according to claim 28, further comprising a second tube fitting step of fitting an outer periphery member made of a flexible material on the outer periphery of a sealing plate with the through-hole provided therein, so as to form the sealing unit.

30. A method for producing an electrolytic capacitor according to claim 28, wherein the tube fitting step further comprises a step of continuously supplying a longer tube than the size for use of the tube to be fitted and sequentially cutting the tube at the size for use.

* * * * *